United States Patent
Yamamoto et al.

(10) Patent No.: US 6,657,539 B2
(45) Date of Patent: Dec. 2, 2003

(54) VEHICLE CONTROL APPARATUS AND VEHICLE CONTROL METHOD

(75) Inventors: Shinsuke Yamamoto, Anjo (JP); Akira Nagae, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 76 days.

(21) Appl. No.: 10/013,541

(22) Filed: Dec. 13, 2001

(65) Prior Publication Data

US 2002/0075139 A1 Jun. 20, 2002

(30) Foreign Application Priority Data

Dec. 14, 2000 (JP) ............................... 2000-380531

(51) Int. Cl.[7] ................................. B60Q 1/00
(52) U.S. Cl. ...................... 340/438; 340/439
(58) Field of Search .................... 340/436, 438, 340/439, 459, 466, 467, 457.4; 701/34, 76, 301; 303/122.05, 122.08, 182, 191; 180/275, 282, 169

(56) References Cited

U.S. PATENT DOCUMENTS

| | | | | |
|---|---|---|---|---|
| 4,864,202 A | | 9/1989 | Nitschke et al. ............ 318/560 |
| 5,326,146 A | * | 7/1994 | Takeuchi ................... 280/735 |
| 5,447,363 A | | 9/1995 | Fukamachi ................. 303/125 |
| 5,549,368 A | * | 8/1996 | Yasuzumi ............... 303/122.08 |
| 5,805,797 A | * | 9/1998 | Sato et al. .................. 714/48 |
| 5,922,038 A | * | 7/1999 | Horiuchi et al. ............. 701/34 |
| 6,105,705 A | | 8/2000 | Faye ......................... 180/275 |
| 6,267,194 B1 | | 7/2001 | Bullinger et al. ........... 180/275 |
| 6,315,373 B1 | | 11/2001 | Yamada et al. ............. 303/191 |
| 6,359,553 B1 | | 3/2002 | Kopischke ................. 340/436 |

FOREIGN PATENT DOCUMENTS

| | | | |
|---|---|---|---|
| EP | 0 967 121 A2 | 12/1999 | |
| EP | 1 010 596 A2 | 6/2000 | |
| EP | 1 055 577 A1 | 11/2000 | |
| JP | 02018135 A | * 1/1990 | ............ 280/735 |
| JP | A 9-136659 | 5/1997 | |
| JP | A 9-142284 | 6/1997 | |
| JP | 10029567 A | * 2/1998 | |
| JP | A 11-34796 | 2/1999 | |
| JP | A 11-235969 | 8/1999 | |
| JP | A 11-334576 | 12/1999 | |

* cited by examiner

*Primary Examiner*—Van Trieu
(74) *Attorney, Agent, or Firm*—Oliff & Berridge PLC

(57) ABSTRACT

A control apparatus and method for a vehicle that has at least one detector that detects a running state of the vehicle, and a controller that receives a result of detection by the detector and controls a predetermined vehicle-installed apparatus. The controller determines whether the detector has failed; restricts a control process by which the controller controls the vehicle running state if it is determined that the detector has failed; detects a collision state of the vehicle; and restricts the determination that the detector has failed, for a predetermined time following detection of the collision state of the vehicle, if the collision state is detected. If the collision state of the vehicle is detected, the controller changes the determining process by which the detector is determined to have failed in such a direction as to restrict the determination that the detector has failed; for example, the controller changes the threshold for failure determination, or prohibits determination that the detector has failed. Therefore, even if an excessively great detection result is temporarily output from the detector due to the effect of an impact caused by a collision or the like, it is possible to avoid an event that it is immediately determined that the detector has failed.

20 Claims, 15 Drawing Sheets

VEHICLE CONTROL APPARATUS AND VEHICLE CONTROL METHOD

INCORPORATION BY REFERENCE

The disclosure of Japanese Patent Application No. 2000-380531 filed on Dec. 14, 2000, including the specification, drawings and abstract is incorporated herein by reference in its entirety.

BACKGROUND OF THE INVENTION

1. Field of Invention

The invention relates to a vehicle control apparatus and a vehicle control method capable of continuing an appropriate control operation even if a vehicle collides with another object.

2. Description of Related Art

Impact reducing apparatus for reducing the impact caused by a collision of a vehicle with an object have been proposed. For example, Japanese Patent Application Laid-Open No. 9-136659 discloses an apparatus that, if a yaw moment acts on the vehicle, reduces the impact on the vehicle by steering the vehicle's rear wheels to such a direction as to promote a yaw motion of the vehicle. Also disclosed is a technology that reduces the impact while maintaining a stable vehicle posture by controlling the damping force of a suspension so as to suppress the rolling of the vehicle.

If results of detection by various sensors, such as an acceleration sensor, a yaw rate sensor, etc., are read to control various apparatus installed in a vehicle, it is a common practice to determine whether each sensor functions normally. For example, if the level of a detection signal from a sensor is out of a predetermined range, it is determined that the sensor has a failure. Then, an appropriate action is taken; for example, a predetermined control process is prohibited.

However, the level of a detection signal from a sensor can go out of a predetermined range due to an effect of impact caused by a collision. In such a case, it is determined that the sensor has a failure, even though the sensor actually functions in a normal manner. Thus, if a predetermined control is performed after occurrence of a collision, the control may fail to fully achieve its advantages in some cases.

SUMMARY OF THE INVENTION

It is an object of the invention to provide vehicle control apparatus and vehicle control methods capable of preventing a false determination that a sensor has a failure at the time of a collision, and therefore capable of performing a good control even after the collision as long as the sensor functions normally.

A first aspect of the invention relates to a vehicle control apparatus for controlling a running state of a vehicle, including at least one detector that detects the running state of the vehicle, and a controller that receives a result of detection by the detector and controls a predetermined vehicle-installed apparatus. The controller also determines whether the detector has failed, restricts a control process by which the controller controls the vehicle running state if it is determined that the detector has failed, detects a collision state of the vehicle, and, if the collision state of the vehicle is detected, changes a determining process of determining whether the detector has failed so as to restrict determination that the detector has failed, for a predetermined time following detection of the collision state.

The "predetermined time" means a period of time during which at least a collision state is detected.

The controller determines whether a failure has occurred in the detector. If a failure of the detector is detected, the controller restricts the control process performed by the controller; for example, the controller prohibits a running state control operation from being started by the controller.

If in this case, the collision state of the vehicle is detected, the controller changes the determining process by which the detector is determined to have failed in such a direction as to restrict the determination that the detector has failed; for example, the controller changes the threshold for failure determination, or prohibits determination that the detector has failed. Therefore, even if an excessively great detection result is temporarily output from the detector due to the effect of an impact caused by a collision or the like, it is possible to avoid an event that it is immediately determined that the detector has failed.

The period during which the failure determination is changed is within a period during which at least the collision state is detected. The normal failure determination process preferably is restarted immediately after the collision state ends.

In accordance with a second aspect of the invention, a vehicle control apparatus for controlling a running state of a vehicle includes at least one detector that detects the running state of the vehicle, and a controller that receives a result of detection by the detector and controls a predetermined vehicle-installed apparatus. The controller also determines whether the detector has failed, restricts a control process by which the controller controls the vehicle running state if it is determined that the detector has failed, detects a collision state of the vehicle, and, if the collision state of the vehicle is detected, prohibits the restricting operation of the control process of the controller for a predetermined time following detection of the collision state.

The "predetermined time" means a period of time during which at least a collision state is detected.

The controller determines whether a failure has occurred in the detector. If a failure of the detector is detected, the controller restricts the control process performed by the controller; for example, the controller prohibits a running state control operation from being started by the controller.

If in this case, the collision state of the vehicle is detected, the restricting operation of the controller is prohibited; for example, the running state control operation is continued as normal, regardless of the determination as to whether the detector has failed. Therefore, even if an excessively great detection output is temporarily produced from the detector due to the effect of an impact caused by a collision or the like so that it could be determined that a failure has occurred in the detector, it is possible to avoid an event that the restriction of the control process is performed during the collision.

The period during which the restricting operation is prohibited is within a period during which at least the collision state is detected. After this predetermined period elapses, the normal restricting process is allowed immediately following the end of the collision state. Therefore, if the detector actually has a failure, the control process of the controller is restricted at the elapse of the predetermined period.

In accordance with a third aspect of the invention, a vehicle control apparatus for controlling a running state of a vehicle includes at least one detector that detects the running state of the vehicle, and a controller that receives a result of detection by the detector and controls a predetermined vehicle-installed apparatus. The controller also determines whether the detector has failed, restricts a control process by which the controller controls the running state of the vehicle if it is determined that the detector has failed, detects a collision state of the vehicle, and, if the collision state of the vehicle is detected during a control of the vehicle running state by the controller, prohibits the restricting of the control process and restrains a change in a control state under the control process for a predetermined time following detection of the collision state, and, after an elapse of the predetermined time, cancels prohibition of the control process and restarts the control process by the controller.

The "predetermined time" means a period of time during which at least a collision state is detected.

In some cases, a collision state of the vehicle is detected during the vehicle running state control operation performed by the controller. If in such a case, the vehicle running state control process is stopped as for example, the control state under the control may immediately change and may therefore dismay a driver. Furthermore, due to the effect of an impact caused by a collision, an excessively great detection result may be temporarily output from the detector. If a normal control is continued in such a case, the effect of the excessively great detection result may change the control state so that the driver may be dismayed.

Therefore, for the predetermined time following the detection of the collision state, the restricting of the control process is prohibited so that change in the control state is restrained. Thus, while the collision state is being detected, change in the control state is restrained. Therefore, it becomes possible to avoid an event that the drive is dismayed due to a change in the control state. After the predetermined time elapses, the prohibition of the restricting is canceled. Therefore, at this time point, the control process will be restricted if the detector actually has failed. If the detector functions normally after the collision, the control by the controller is restarted. Therefore, the effect of the control can be fully obtained until the vehicle comes to a stop.

In the first to third aspects of the invention, the controller may control a braking force applied to each wheel so as to stabilize a vehicle behavior of the vehicle.

If the controller controls the vehicle behavior, the vehicle control apparatus in accordance with the first or second aspect is able to perform a predetermined behavior control even during a collision state because the vehicle control apparatus avoids transition to a control designed to be executed at the time of failure of the detector at least during the collision state. In the vehicle control apparatus of the third aspect, the change in the control state under the behavior control is restrained while the collision state is being detected. After the collision state ends, a good vehicle behavior control can be performed until the vehicle comes to a stop, provided that the detector functions normally.

Therefore, during a period from occurrence of a collision state to the stop of the vehicle, the effect of the vehicle behavior control for stabilizing the behavior of the vehicle can be fully obtained without causing a driver discomfort due to a change in the control state.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF PREFERRED EMBODIMENTS

Preferred embodiments of the invention will be described in detail hereinafter with reference to the accompanying drawings.

Figure 1:
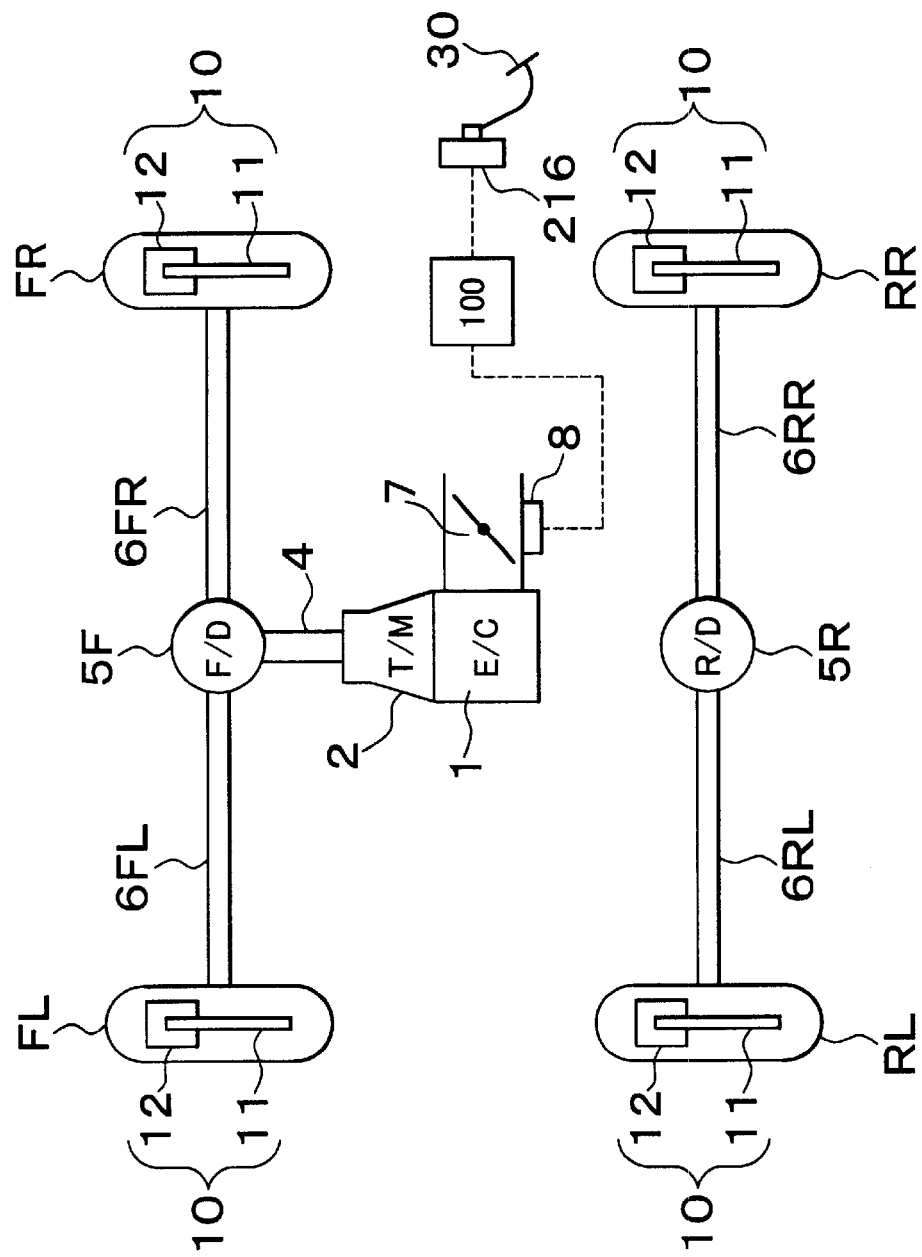
FIG. 1 is a schematic diagram illustrating a two-wheel drive vehicle equipped with a vehicle behavior control apparatus in accordance with a first embodiment of the invention.

FIG. 1 schematically illustrates a drive system of a two-wheel drive vehicle equipped with a vehicle behavior control apparatus for stabilizing the behavior of the vehicle, as a vehicle control apparatus in accordance with a first embodiment of the invention. Rotation output of an engine 1 is transferred to a front wheel-side drive shaft 4 via a transmission 2, and is transferred to drive shafts 6FL, 6FR via a front differential 5F, thereby rotating front wheels FL, FR. Drive shafts 6RL, 6RR are connected by a rear differential 5R. The drive shafts 6RL, 6RR are connected to wheels RL, RR, respectively.

Each of the wheels FL, FR, RL, RR is provided with a brake device 10. Each brake device 10 forms a disc brake that has a disc rotor 11 that rotates together with the wheel FL, FR, RL, RR, and a caliper 12 disposed at an outer edge portion of the disc rotor 11. The caliper 12 has friction pads that are pressed against two side surfaces of the disc rotor 11, as well as a wheel cylinder 26 (see FIG. 2) that contains a pressing piston that presses the friction pads against the disc rotor 11 by an oil pressure supplied thereto, etc.

In an intake system passage for introducing intake air into the engine 1, a throttle valve 7 for controlling the amount of intake air is provided. The throttle valve 7 is operated to a predetermined degree of opening by a throttle motor 8.

Figure 2:
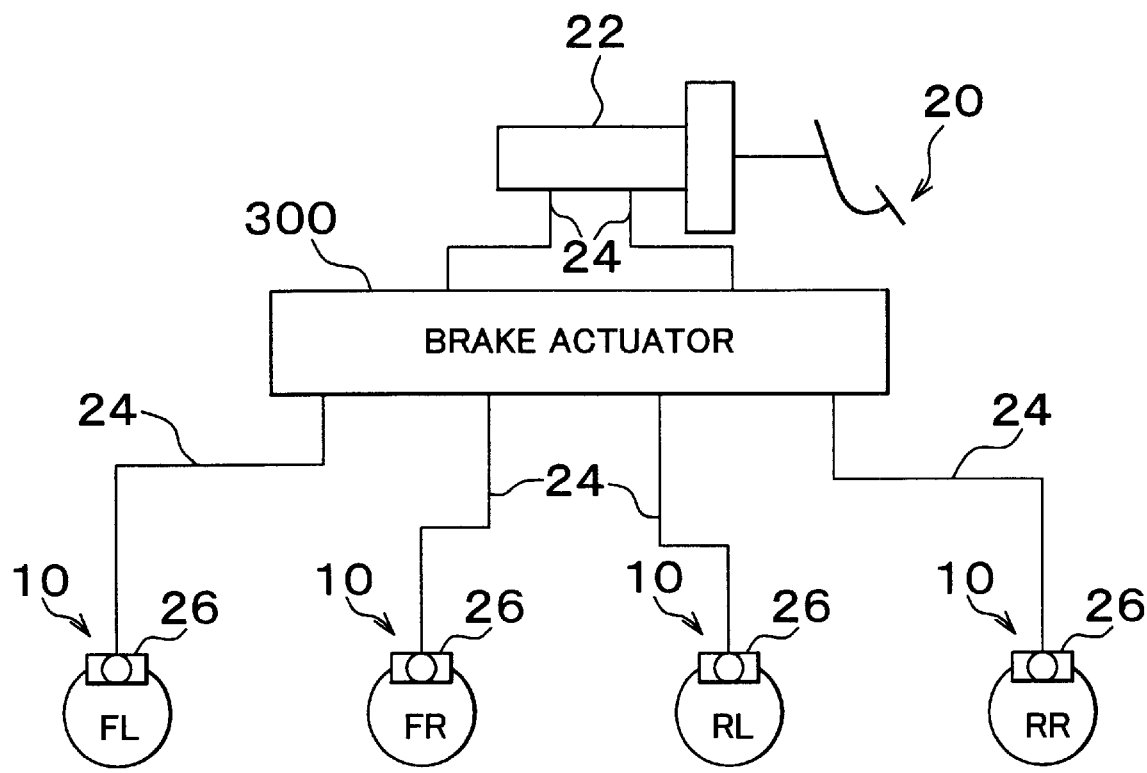
FIG. 2 is a schematic system diagram illustrating an oil pressure control system for actuating brake devices.

FIG. 2 illustrates an oil pressure control system for actuating the brake devices 10 of the wheels FL, FR, RL, RR. A master cylinder 22 has two pressurizing chambers that are independent of each other and are connected in series. A pedaling operation on a brake pedal 20 is transferred to a piston in each pressurizing chamber in the master cylinder 22. Therefore, oil pressures corresponding in magnitude to the operating force on the brake pedal 20 are generated in the pressurizing chambers. The oil pressure generated in each pressurizing chamber is led to a brake actuator 300 via an oil pressure pipe 24. Oil pressures individually controlled in the brake actuator 300 are supplied to the wheel cylinders 26 of the brake devices 10 via the oil pressure pipes 24.

The brake actuator 300 has a hydraulic pump capable of raising oil pressure in the wheel cylinders 26, separately from the operation of the brake pedal 20, and a control valve for controlling passage of hydraulic oil that flows in the brake actuator 300. Through control of the operations of the hydraulic pump and the control valve, the brake actuator 300 is able to raise, lower and maintain oil pressure in each wheel cylinder 26, independently of the braking operation of a driving person.

The operations of the brake actuator 300 and the throttle valve 7 are controlled by a control apparatus 100.

Figure 3:
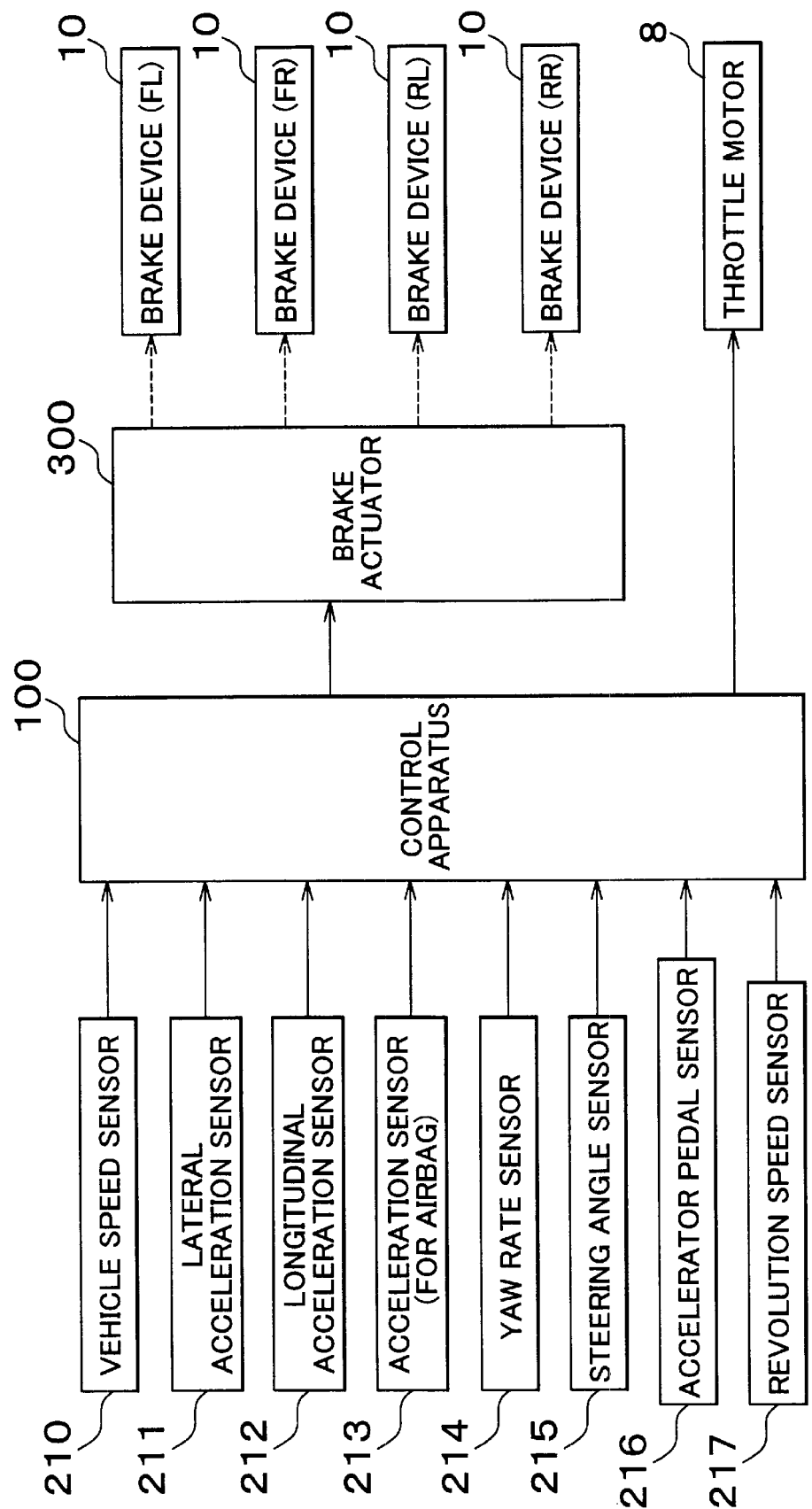
FIG. 3 is a block diagram illustrating an overall construction of a control system.

FIG. 3 schematically illustrates an overall construction of a vehicle control apparatus that includes the control apparatus 100. The control apparatus 100 receives results of detection by a vehicle speed sensor 210 for detecting a vehicle speed V, a lateral acceleration sensor 211 for detecting a lateral acceleration Gy that acts on a vehicle body, a longitudinal acceleration sensor 212 for detecting a longitudinal acceleration Gx that acts on the vehicle body, an acceleration sensor 213 for detecting an acceleration that is greater than the accelerations detected by the lateral acceleration sensor 211 and the longitudinal acceleration sensor 212, a yaw rate sensor 214 for detecting a yaw rate y on the vehicle body, a steering angle sensor 215 for detecting a steering angle θ, an accelerator pedal sensor 216 for detecting an amount of depression Accp of an accelerator pedal 30, a revolution speed sensor 217 for detecting an engine revolution speed Ne, etc. On the basis of the results of detection, the control apparatus 100 controls the operations of the brake actuator 300 and the throttle valve 7.

Control operations performed by the control apparatus 100 will be described.

The control apparatus 100 controls the behavior of the vehicle by distributing the drive power (including the braking force) to the wheels. A technique adopted in this embodiment for distributing braking force to the right and left wheels and the front and rear wheels will be described.

First, a distribution technique for the right and left wheels will be described.

Figure 4:
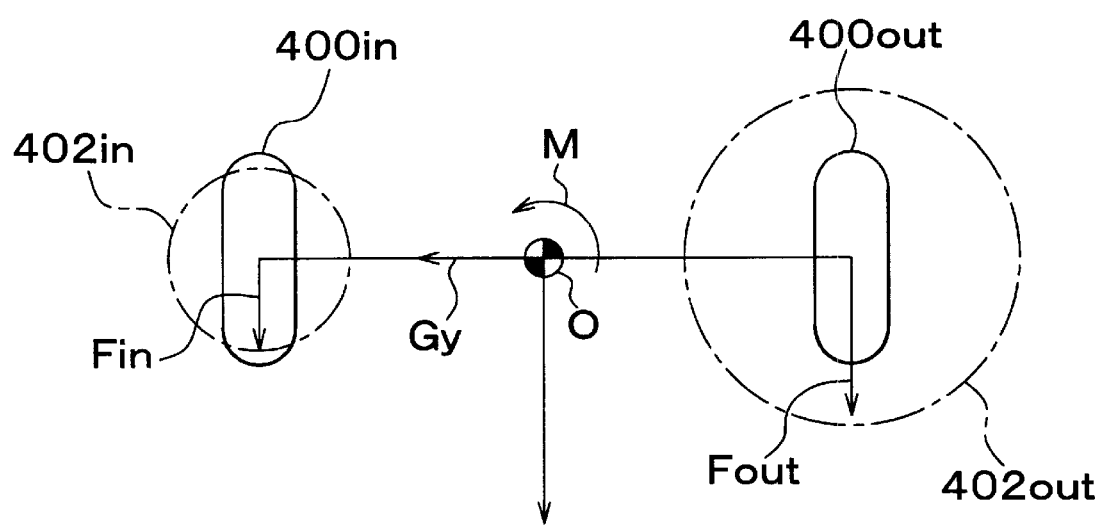
FIG. 4 is a diagram illustrating a vehicle model with a pair of right and left wheels in a leftward turning state.

A state as indicated in FIG. 4 is assumed in which a vehicle model having a right-side wheel and a left-side wheel with zero wheelbase is turning left at a lateral acceleration Gy. A friction circle 402out of an outer wheel 400out is greater than a friction circle 402in of an inner wheel 400in due to a load shift. In particular, the inner wheel friction circle radius Finmax and the outer wheel friction circle radius Foutmax can be expressed as in equations (1) and (2):

$$\text{Finmax} = m*g/2 - m*Gy*h/t \quad (1)$$

$$\text{Foutmax} = m*g/2 + m*Gy*h/t \quad (2)$$

where m is the weight of the vehicle, g is the gravitational acceleration, h is the height of the vehicle at the center O of gravity, and t is the tread.

Figure 5:
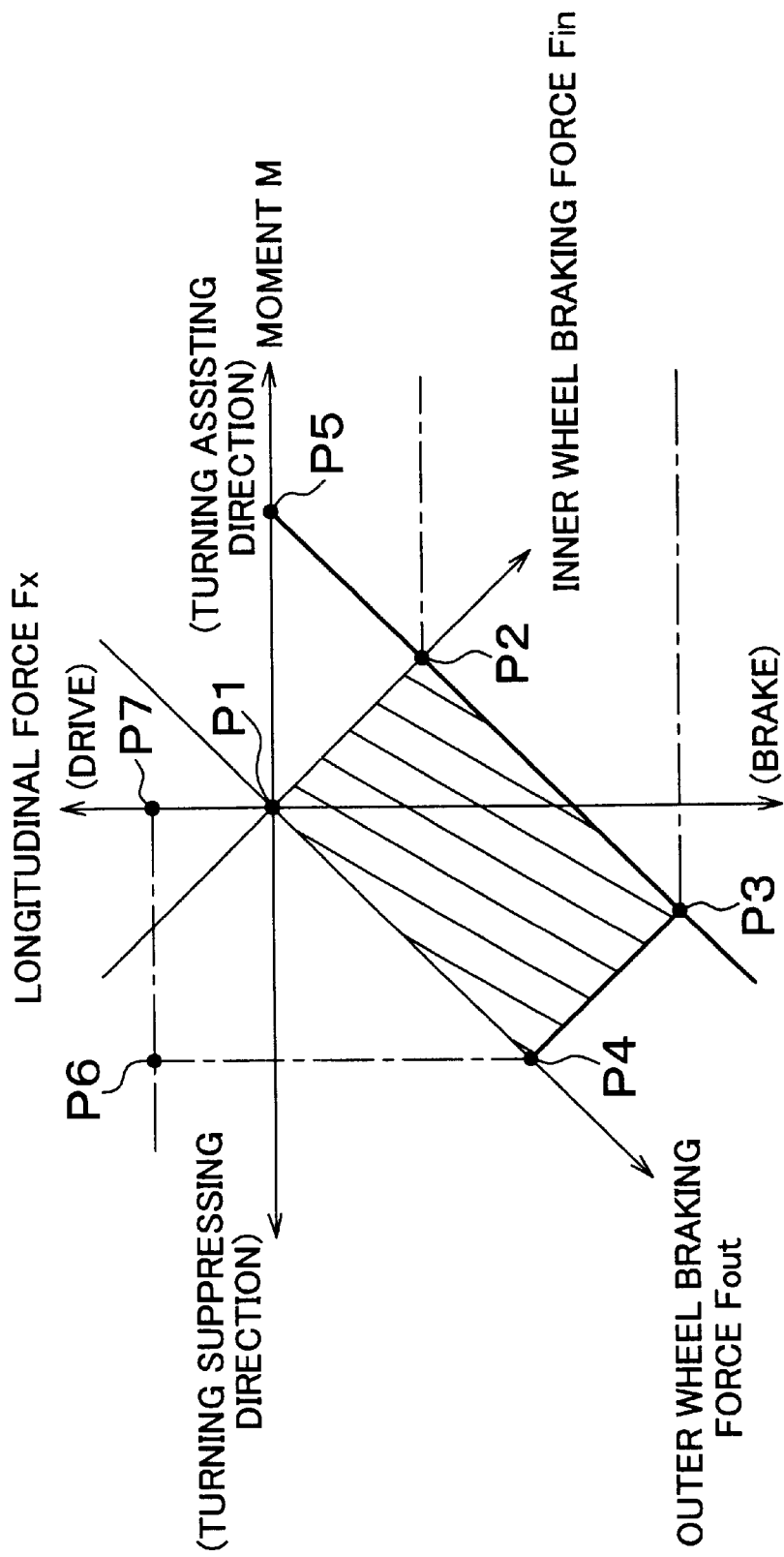
FIG. 5 is a graph indicating relationships among the moment M, the longitudinal force Fx, and the inner and outer wheel braking forces Fin and Fout, and the like when the vehicle behavior has an oversteer tendency.

Therefore, as shown in FIG. 5, the yaw moment and the longitudinal force that act on the vehicle due to braking force is indicated by a hatched rectangular region (controllable range), where the abscissa axis indicates the moment M, and the ordinate axis indicates the longitudinal force Fx. If a target yaw moment Mt and a target longitudinal force Fx are within the controllable range, a target braking force for the inner wheel and a target braking force for the outer wheel are uniquely determined as values of coordinate points of the feet of perpendiculars on the axis of the inner wheel braking force and the axis of the outer wheel braking force from a coordinate point determined by the target yaw moment Mt and the target longitudinal force Fx with reference to the axis of yaw moment and the axis of longitudinal force.

In contrast, if the target yaw moment Mt and the target longitudinal force Fx are outside the controllable range, the method of determining the target braking forces for the inner wheel and the outer wheel becomes critical. In general, if the vehicle behavior has an oversteer tendency (spin tendency), it is effective to apply an anti-spin moment to the vehicle in order to stabilize the behavior of the vehicle. Therefore, in this embodiment, the distribution of braking force between the right and left wheels is determined with priority given to the achievement of the target yaw moment Mt.

Therefore, if the target yaw moment Mt and the target longitudinal force Fx are present in a region surrounded by points P1, P4, P6, P7 (hereinafter, referred to as "spin region") as indicated in FIG. 5, the target braking force (=0) for the inner wheel and the target braking force for the outer wheel are determined as the coordinates of points obtained by moving the point of coordinates of the target yaw moment and the target longitudinal force in parallel to the axis of the longitudinal force onto the axis of the outer wheel braking force.

If the vehicle behavior generally has an understeer tendency (drift-out tendency), it is effective to bring out deceleration (load shift by the deceleration (a moment occurs in such a direction as to assist the turning) and a vehicle speed reduction) in order to stabilize the behavior of the vehicle. Therefore, in this embodiment, the distribution of braking force between the right and left wheels is determined with priority given to the achievement of the target longitudinal force.

Therefore, if the target yaw moment and the target longitudinal force exist in a region which is between a straight line extending through the point P2 parallel to the axis of moment M and a straight line extending through a point P3 parallel to the axis of moment M, and which is below the straight line extending between the point P5 and the point P3 (hereinafter, the region will be referred to as "drift-out region"), the target braking forces for the inner wheel and the outer wheel are determined as the coordinates of a point obtained by moving the point of coordinates of the target yaw moment and the target longitudinal force in parallel to the axis of moment onto a line segment P2-P3.

In embodiments described below, the target yaw moment Mt and the target longitudinal force Fx are calculated exclusively as values that are within the controllable range, the spin region or the drift-out region. However, if the target yaw moment and the target longitudinal force are calculated as values in a region other than the controllable range, the spin range and the drift-out region, the target braking forces for the inner wheel and the outer wheel are determined as values corresponding to a point on the boundary line of the controllable range that is substantially closest to the coordinate point of the calculated values.

For example, if the target yaw moment and the target longitudinal force are within a region that is below the straight line passing through the point P6 and the point 7, and above the axis of the outer wheel braking force, and leftward of a line segment P6-P4, the target braking forces for the inner wheel and the outer wheel are determined as the coordinates of the point P4. If the target yaw moment and the target longitudinal force are in a region that is below the axis of the outer wheel braking force, and above the straight line passing through the point P5 and the point P3, and below the straight line passing through the point P3 and the point P4, the target braking forces for the inner wheel and the outer wheel are determined as the coordinates of a point obtained by moving the point of coordinates of the target yaw moment and the target longitudinal force in parallel to the axis of the outer wheel braking force onto a line segment P3-P4.

If the target yaw moment and the target longitudinal force are in a triangular region defined by the points P1, P2, P5, the target braking force for the inner wheel and the target braking force for the outer wheel (=0) are determined as the coordinates of a point obtained by moving the point of coordinates of the target yaw moment and the target longitudinal force in parallel to the axis of the outer wheel braking force onto the axis of the inner wheel braking force. Furthermore, if the target yaw moment and the target longitudinal force are in a region that is above the straight line extending through the point P2 in parallel to the axis of moment, and below the straight line passing through the point P5 and point P3, the target braking forces for the inner wheel and the outer wheel are determined as the coordinates of the point P2. Still further, if the target yaw moment and the target longitudinal force are in a region that is below the straight line extending through the point P3 in parallel to the axis of moment, and below the straight line passing through the point P5 and point P3, the target braking forces for the inner wheel and the outer wheel are determined as the coordinates of the point P3.

Figure 6:
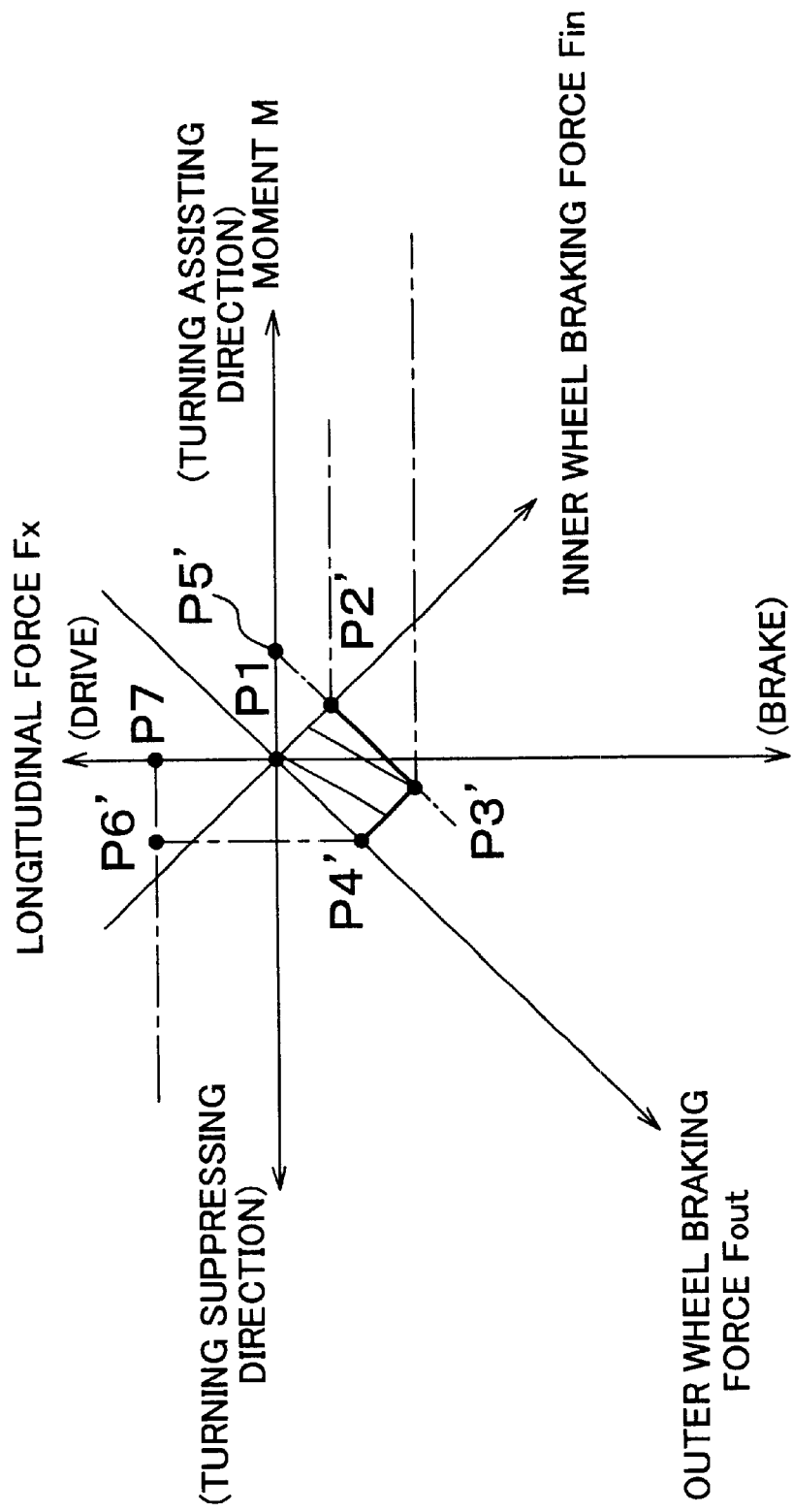
FIG. 6 is a graph indicating relationships among the moment M, the longitudinal force Fx, and the inner and outer wheel braking forces Fin and Fout, and the like when the vehicle behavior has an understeer tendency.

However, if the oversteer state of the vehicle is to be controlled, the lateral force associated with the application of braking force must be reduced. Therefore, it is preferable that the braking forces for the inner wheel and the outer wheel be set to or below ⅓ of the corresponding wheel friction circle radii, as indicated in FIG. 6. If the braking forces are about ⅓ of the friction circle radii, the reduction in lateral force can be curbed to about 5%.

Figure 7:
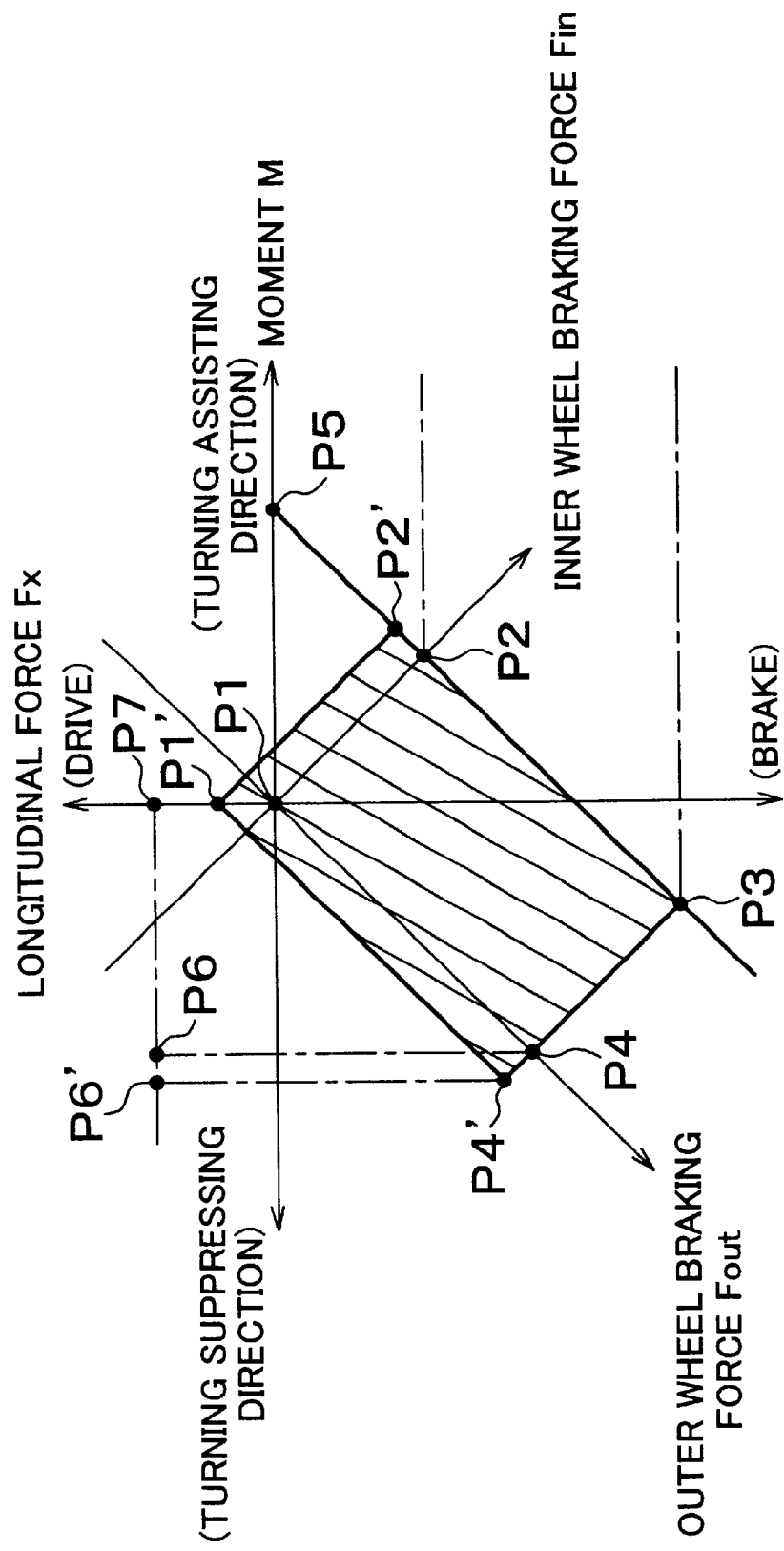
FIG. 7 is a graph indicating relationships among the moment M, the longitudinal force Fx, and the inner and outer wheel braking forces Fin and Fout, and the like when the behavior of a vehicle in which at least front wheels are driven has an oversteer tendency.

If drive power is applied to at least front wheels as in front-wheel drive vehicles and four-wheel drive vehicles, the yaw moment and the longitudinal force that can be applied to the vehicle occupy a region indicated by hatching in FIG. 7. The controllable range becomes greater than the controllable range provided when the control is based only on braking force. With regard to a vehicle behavior with an understeer tendency, only the braking force is controlled. With regard to a vehicle behavior with an oversteer tendency, the wheel drive force is adopted as a control factor as well, so that an increased anti-spin moment is applied to the vehicle and so that the vehicle deceleration can be lessened.

Next, a technique for distribution of forces between the front and rear wheels will be described.

Figure 8:
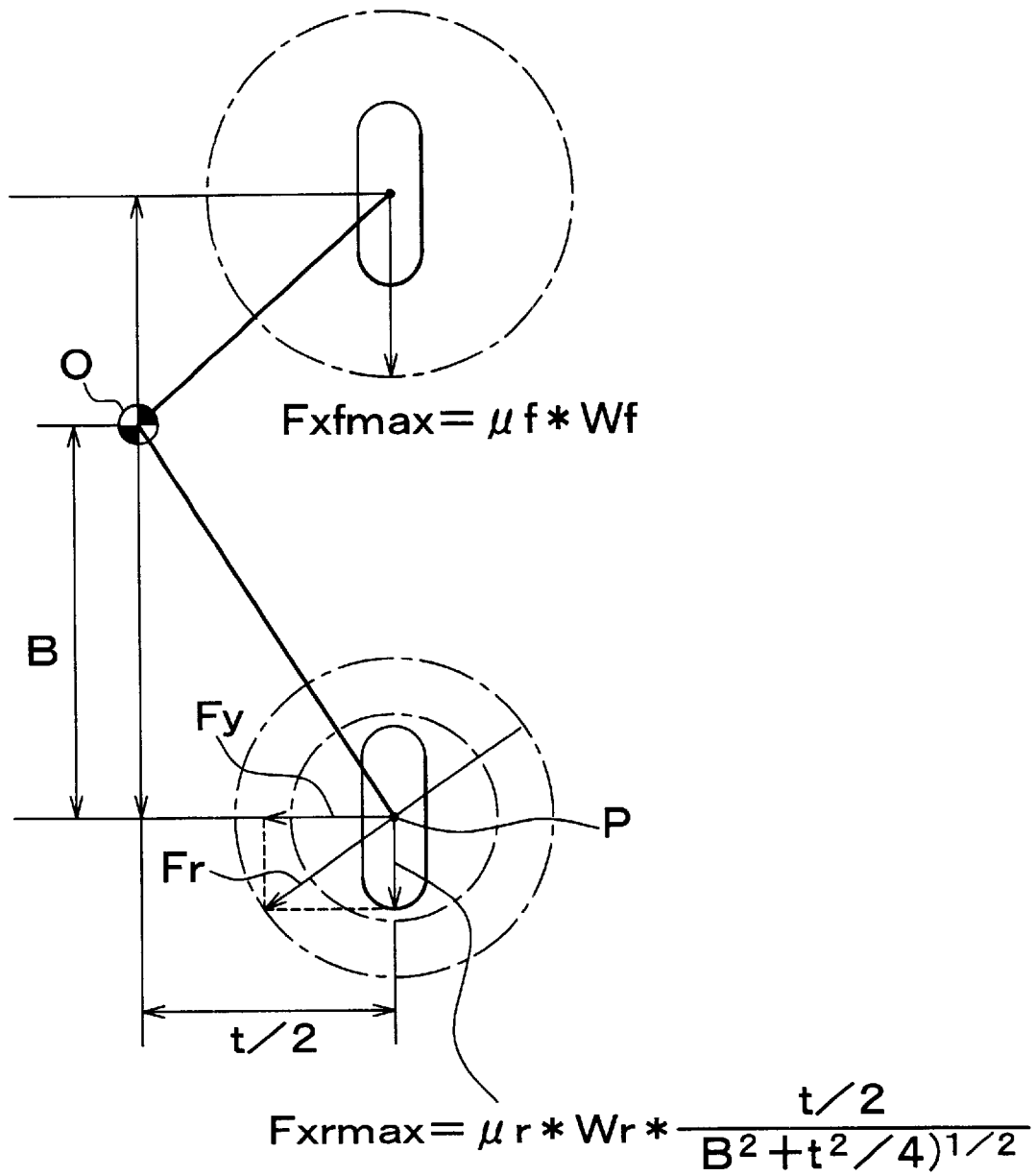
FIG. 8 is a diagram illustrating a fashion of distributing braking force between front and rear wheels when the vehicle behavior has an oversteer tendency.

In a braking control with respect to oversteer tendency, the anti-spin moment applied to the vehicle increases with increases in the braking force on the outer front wheel that is outward in the direction of a radius of turning. Therefore, the maximum value Fxfmax of the longitudinal force (braking force) on a front wheel becomes equal to the radius of the friction circle of the wheel as indicated in FIG. 8. The maximum value Fxfmax of the longitudinal force on each front wheel can be expressed as in equation (3):

$$Fxfmax = \mu f * Wf \quad (3)$$

where $\mu f$ is the friction coefficient of a road surface with respect to the front wheel, and Wf is the load of the front wheel.

If braking force is to be applied to rear wheels, it is necessary to determine the braking force by factoring in both the moment given by the braking force and the moment that reduces with reductions in the lateral force. That is, as indicated in FIG. 8, a maximum value Fxrmax of the braking force on a rear wheel must be determined such that the direction of a resultant force Fr of the braking force Fxrmax and the lateral force Fy is perpendicular to a straight line connecting the center O of gravity of the vehicle and the ground contact point of the rear wheel in a view from above the vehicle, and such that the magnitude of the resultant force Fr is equal to the radius of the friction circle of the rear wheel. Therefore, given the distance B between the center O of gravity and the axis of turning of the rear wheel, and the friction coefficient $\mu r$ between the rear wheel and the road surface, and the load Wr of the rear wheel, the maximum value of the braking force on the rear wheel can be expressed as in equation (4):

$$Fxrmax = \mu r * Wr * (t/2)/(B^2 + t^2/4)^{1/2} \quad (4)$$

The braking force is distributed between the front and rear wheels in accordance with the ratio between the maximum values Fxfmax and Fxrmax of braking force on the front and rear wheels.

In the braking control with respect to the understeer tendency, the braking force is distributed between the front and rear wheels at proportions that are proportional to the friction circle radii of the front and rear wheels.

Adopting the above-described braking force distributing techniques, the control apparatus 100 carries out the behavior control of the vehicle.

Furthermore, the control apparatus 100 performs various control operations based on results of detection by the various sensors. Therefore, if any one of the sensors fails, it may become impossible to continue a good control operation. Hence, the control apparatus 100 always monitors the sensors for failures.

Figure 9:
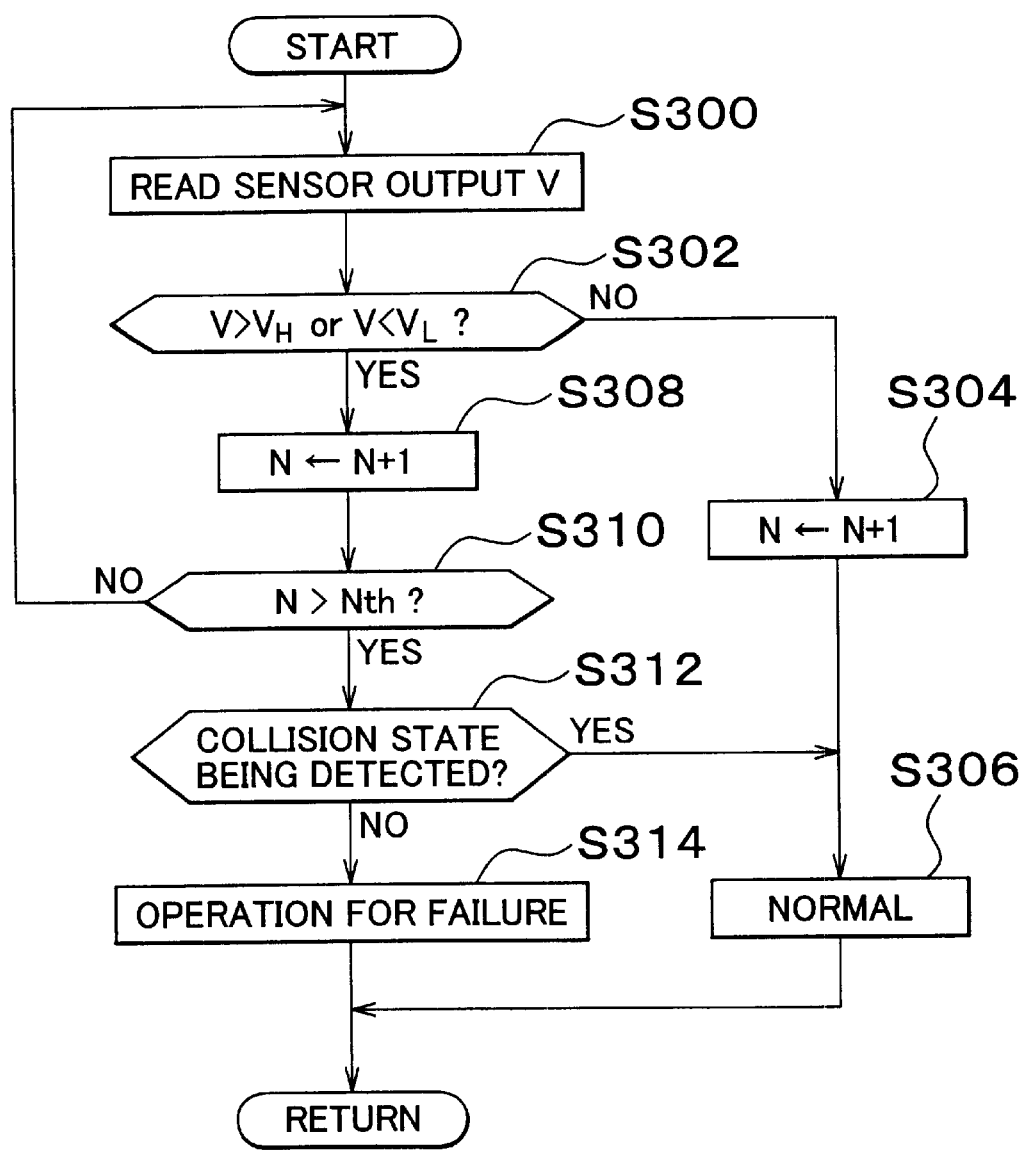
FIG. 9 is a flowchart illustrating a sensor failure determining routine.

A flowchart illustrating a sensor failure determining process is shown in FIG. 9. The sensor failure determining processes for the lateral acceleration sensor 211, the longitudinal acceleration sensor 212, the acceleration sensor 213 for an airbag, the yaw rate sensor 214, etc., are substantially the same as the process illustrated by the flowchart of FIG. 9. The failure determining processes for the individual sensors are executed in parallel. These failure determining processes are started upon a turning-on operation of an ignition switch.

First, in step (hereinafter, referred to as "S") 300, a sensor output V, that is, a result of detection by a sensor that is subjected to the failure determining process, is read. Subsequently in S302, it is determined whether the value of the sensor output V is greater than a predetermined upper limit value $V_H$, or is less than a predetermined lower limit value $V_L$. The upper limit value $V_H$ and the lower limit value $V_L$ are prescribed based on an output level that could not be continually produced during a normal run of the vehicle (that is, that would not occur in the vehicle during a normal run of the vehicle).

If the determination in S302 is "NO", that is, if the sensor output V is within the range of $V_H \geq V \geq V_L$, it is determined that the sensor has no failure. In this case, the process proceeds to S304, in which the count value N of a counter is reset as N=0. Subsequently in S306, it is determined that the sensor is "normal" as a result of the failure determining routine of the present cycle.

Conversely, if the determination in S302 is "YES", that is, if the value of the sensor output V is greater than the predetermined upper limit value $V_H$, or is less than the predetermined lower limit value $V_L$, the process proceeds to S308, in which the count value N of the counter is incremented. That is, the count value N of the counter is changed to a new count value N by adding "1" to the current count value N.

Subsequently in S310, it is determined whether the count value N incremented in S308 is greater than a predetermined threshold value Nth. If the determination at S310 is "NO", the process goes back to S300. After the above-described process is repeated, it may be determined in S310 that the count value N has become greater than the threshold value Nth ("YES" at S310). This means that a situation in which the magnitude of the sensor output V is outside the upper and lower limit values $V_H$, $V_L$ has continued for a time prescribed by the threshold value Nth for the count value N.

In this case, the process proceeds to S312, in which it is determined whether a collision state of the vehicle is being detected based on a determination result provided by a collision determination routine described below. If a collision state is being detected ("YES" at S312), there is a possibility of the sensor output being excessively increased by an effect of the collision of the vehicle. Therefore, it is not immediately determined that the sensor has a failure, but the process proceeds to S306, in which it is considered that the sensor is functioning normally at the present stage. Then, the failure determining process starting at S300 is repeated.

Conversely, if it is determined in S312 that the vehicle is not in the collision state ("NO" at S312), it is possible to determine that the sensor has a failure, without a need to consider the effect of a vehicle collision. In this case, the process proceeds to S314, in which a predetermined operation for a sensor failure is performed. For example, a flag indicating occurrence of the sensor failure to other control routines is set, and/or an indicator lamp indicating occurrence of the sensor failure is turned on.

By performing the above-described failure determining process for each sensor, the control apparatus 100 determines whether there is a failure in any sensor.

Figure 10:
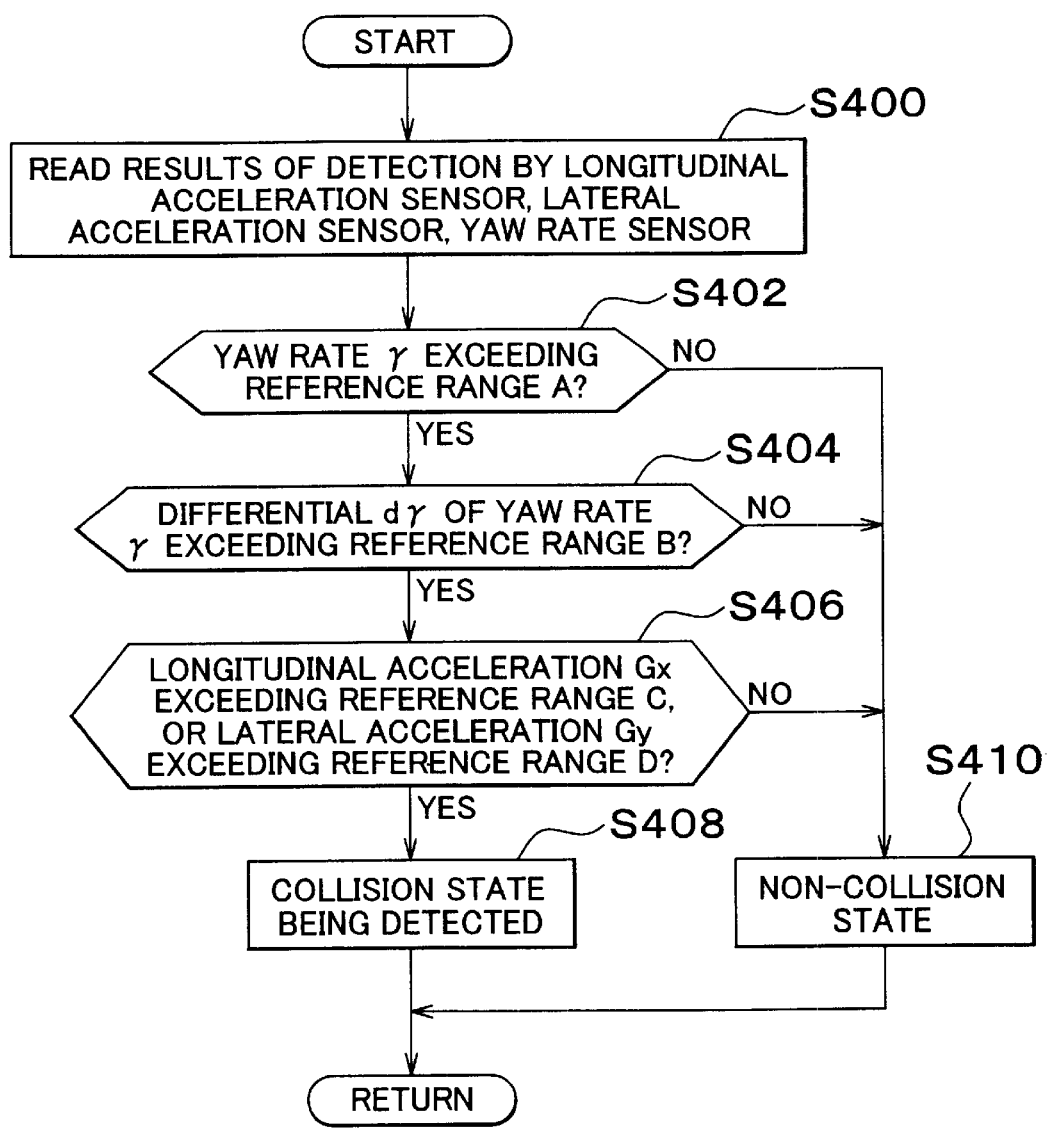
FIG. 10 is a flowchart illustrating a collision determining routine.

As described above, the control apparatus 100 detects whether the vehicle is in a collision state where the vehicle is in collision with an object. An example of the detection process is illustrated in the flowchart of FIG. 10.

The process illustrated by the flowchart starts upon the turning-on of the ignition switch. First in S400, results of detection by the longitudinal acceleration sensor 212, the lateral acceleration sensor 211 and the yaw rate sensor 214 are read. Subsequently in S402, it is determined whether the value of yaw rate γ, that is, one of the detection results, has increased beyond a reference range A that is assumed for a normal vehicle run. If the determination at S402 is "YES", the process proceeds to S404, in which it is determined whether the value of differential dγ of the detected yaw rate γ has increased beyond a reference range B that is assumed for a normal vehicle run. If the determination at S404 is "YES", the process proceeds to S406, in which it is determined whether the value of longitudinal acceleration Gx has increased beyond a reference range C that is assumed for a normal vehicle run, or the value of the lateral acceleration Gy has increased beyond a reference range D that is assumed for a normal vehicle run.

If the determination at S406 is "YES", it can be considered that the vehicle is in the state of collision with an object. Therefore, the process proceeds to S408, in which it is determined that the collision state is being detected in the present cycle of the determination routine.

However, if the determination "NO" results in any one of the determination steps of S402 to S406, the process proceeds to S410, in which it is determined that the vehicle is in a non-collision state in the present cycle of the routine.

Although in FIG. 10, the collision state of the vehicle is detected based on results of detection by the lateral acceleration sensor 211, the longitudinal acceleration sensor 212 and the yaw rate sensor 214, other detection techniques may also be adopted to detect the collision state of the vehicle. For example, the collision state of the vehicle may be detected based on a result of detection by the acceleration sensor 213 for the airbag. The acceleration sensor 213 detects greater accelerations than the lateral acceleration sensor 211 and the longitudinal acceleration sensor 212. Furthermore, upon a collision of the vehicle, the roll rate sharply increases. Therefore, the value of the roll rate and/or the state of change of the roll rate may be used as a basis for detecting the collision state. Still further, a result of detection by a deformation detecting device that detects a deformation of the vehicle body may also be used. Thus, the detection technique is not particularly restricted.

The control apparatus 100 performs the vehicle behavior control of stabilizing the turning behavior of the vehicle while performing the sensor failure determining process as illustrated in FIG. 9 and the collision determination as illustrated in FIG. 10.

A vehicle behavior control process performed by the control apparatus 100 will be described with reference to the flowchart of FIG. 11.

Figure 11:
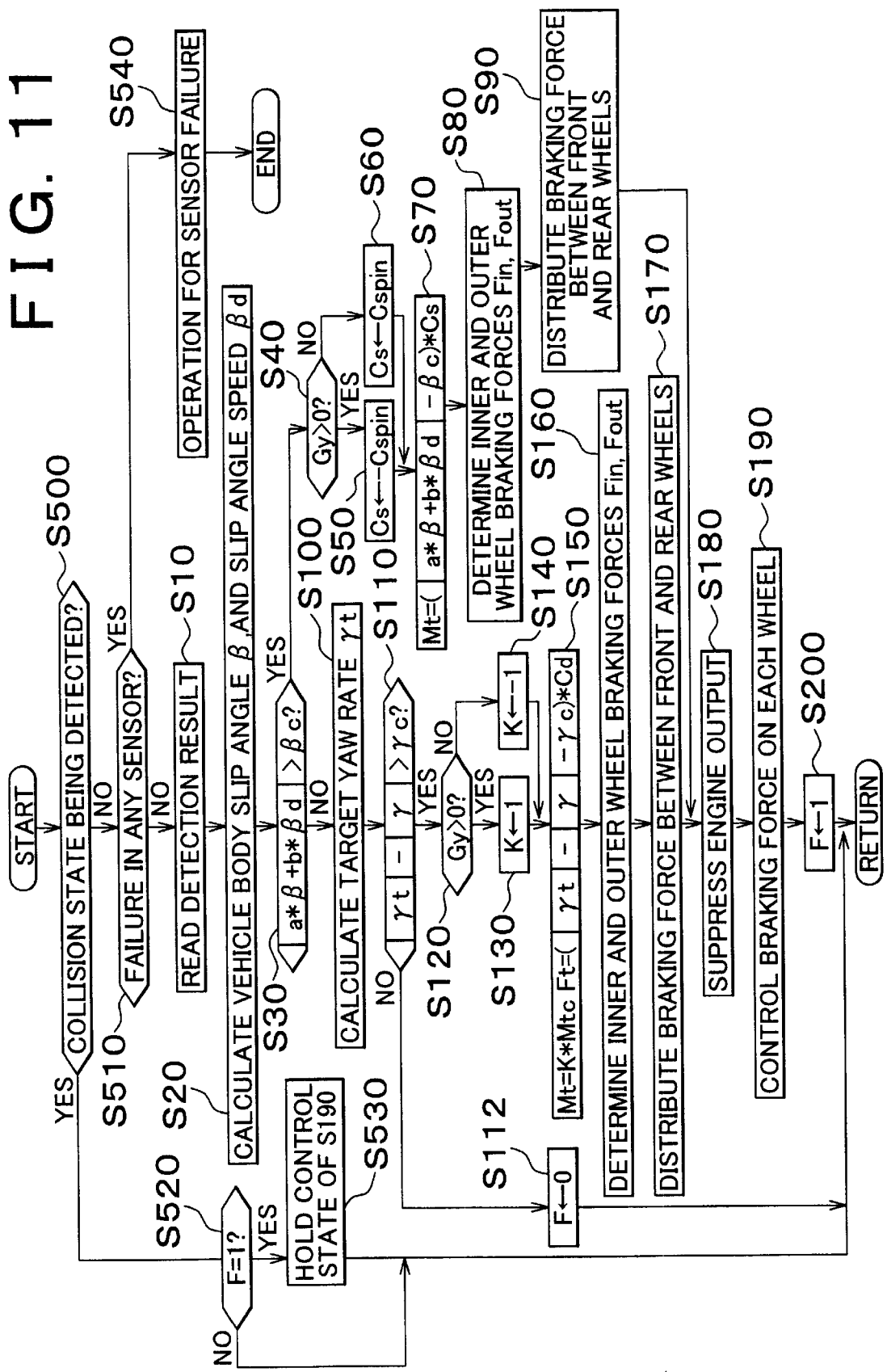
FIG. 11 is a flowchart illustrating a vehicle behavior control process performed by the control apparatus.

The process illustrated by the flowchart of FIG. 11 starts upon the turning-on of the ignition switch. First, in S500, it is determined whether the collision state is being detected based on the result of detection provided by the collision detecting process. If the determination at S500 is "NO", the process proceeds to S510, in which it is determined whether there is a failure in any of the sensors based on the results of the sensor failure determining processes exemplified in FIG. 9. If there is no failure in any sensor ("NO" at S510), the process proceeds to S10, in which an actual control process starts. To facilitate the understanding, description will first be made on the assumption that the determination "NO" results in both S500 and S510, that is, the vehicle is not in the collision state and no sensor has a failure. The processing performed after the determination "YES" results in S500 or S510 will be described below.

First in S10, results of detection by various sensors, including the vehicle speed sensor 210 and the like, are input. Subsequently in S20, a deviation (vehicle skid acceleration) Vyd of the lateral acceleration Gy−V*γ that is a deviation between the lateral acceleration Gy and the product V*γ of the vehicle speed V and the yaw rate γ is determined. By integrating the deviation Vyd of the lateral acceleration, the vehicle body skid speed Vy is determined. A vehicle body slip angle β is calculated as a ratio Vy/Vx of the vehicle body skid speed Vy to the vehicle body longitudinal speed Vx (=vehicle speed V). Furthermore, a vehicle body slip angular speed βd is calculated as a value of differentiation of the vehicle body slip angle β.

Subsequently in S30, it is determined whether the absolute value of a linear sum a*β+b*βd of the vehicle body slip angle β and the vehicle body slip angular speed βd where a and b are positive constants exceeds a reference value βc (positive constant), that is, whether the vehicle is developing a spin tendency.

If the determination at S30 is "YES", that is, if it is determined that the vehicle is developing the spin tendency, the process proceeds to S40. In S40, it is determined whether the lateral acceleration Gy is positive, that is, whether the vehicle is in a left turning state. If the vehicle is in the leftward turning state, the process proceeds to S50, in which the coefficient Cs in equation (5) is set to −Cspin, where Cspin is a positive constant. If the vehicle is in a rightward turning state, the process proceeds to S60, in which the coefficient Cs is set to Cspin.

Subsequently in S70, a target yaw moment Mt is calculated as in equation (5), and the target longitudinal force Ft is set to Ftc (constant).

$$Mt=(|a*\beta+b*\beta d|-\beta c)*Cs \quad (5)$$

Subsequently in S80, the friction circle radii Finmax and Foutmax of the inner wheel and the outer wheel are calculated as in equation (1) and equation (2), respectively, so that the points P2 to P5 indicated on a map exemplified in FIG. 5 or 7 are determined. Furthermore, on the basis of the amount of depression Accp of the accelerator pedal 30 and the engine revolution speed Ne, an output torque Te of the engine 1 is calculated with reference to a prescribed map. On the basis of the speed ratio Rtm of the transmission 2 and the output torque Te drive forces Fdin and Fdout on the inner wheel and the outer wheel are determined with reference to a predetermined map. Therefore, points P1', P4', P6' are determined. From the map of FIG. 7 determined as described above, the outer wheel braking force Fout is determined by the above-described technique.

Subsequently in S90, the outer wheel braking force Fout is distributed between the front and rear wheels in accordance with the flowchart shown in FIG. 12, whereby target braking forces are achieved for the front and rear wheels on the outer side in the direction of radius of the turning of the vehicle.

Figure 12:
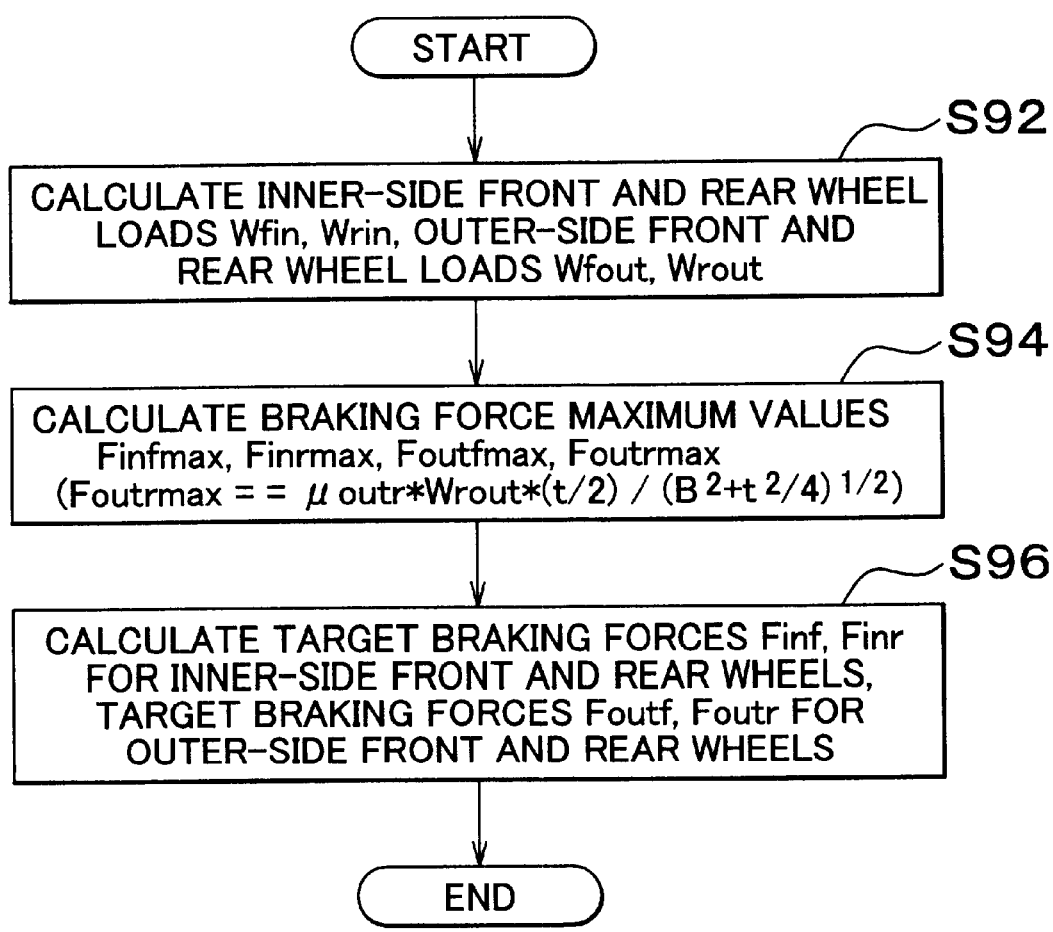
FIG. 12 is a flowchart illustrating a process of distributing braking force between front and rear wheels in S90 of FIG. 11.

In the flowchart of FIG. 12, in S92, the load Wfin of the front wheel and the load Wrin of the rear wheel on the inner side in the direction of radius of the turning are calculated based on the longitudinal acceleration Gx and the lateral acceleration Gy as in equation (6) and equation (7), respectively. Furthermore, the load Wfout of the front wheel and the load Wrout of the rear wheel on the outer side in the direction of radius of the turning are calculated based on the longitudinal acceleration Gx and the lateral acceleration Gy as in equation (8) and equation (9), respectively.

$$Wfin=mf*g/2-m*Gx*h-Cfr*m*Gy*h/t \quad (6)$$

$$Wrin=mr*g/2+m*Gx*h-(1-Cfr)*m*Gy*h/t \quad (7)$$

$$Wfout=mf*g/2-m*Gx*h+Cfr*m*Gy*h/t \quad (8)$$

$$Wrout=mr*g/2+m*Gx*h+(1-Cfr)*m*Gy*h/t \quad (9)$$

where mf and mr are the front wheel-side mass and the rear wheel-side mass of the vehicle, and Cfr is the roll rigidity distribution.

Subsequently in S94, the maximum values Finfmax and Finrmax of the braking forces that can be produced on the front wheel and the rear wheel on the turning radius inner side are calculated as in equation (10) and equation (11) below corresponding to the equation (3) and equation (4). In equations (10) and (11), μinf and μinr are friction coefficients of the road surface with respect to the front wheel and the rear wheel on the turning radius inner side. Furthermore, the maximum values Foutfmax and Foutrmax of the braking forces that can be produced on the front wheel and the rear wheel on the turning radius outer side are calculated as in equation (12) and equation (13) below corresponding to the equation (3) and equation (4). In equations (12) and (13), μoutf and μoutr are friction coefficients of the road surface with respect to the front wheel and the rear wheel on the turning radius outer side.

$$Finfmax=\mu inf*Wfin \quad (10)$$

$$Finrmax=\mu inr*Wrin \quad (11)$$

$$Foutfmax=\mu outf*Wfout \quad (12)$$

$$Foutrmax=\mu outr*Wrout*(t/2)/(B^2+t^2/4)^{1/2} \quad (13)$$

Subsequently in S96, the target braking forces Finf and Finr for the front wheel and the rear wheel on the turning radius inner side are calculated by distributing the inner wheel braking force Fin at proportions that are proportional to the maximum values Finfmax and Finrmax of braking force as in equation (14) and equation (15) below.

Furthermore, the target braking forces Foutf and Foutr for the front wheel and the rear wheel on the turning radius outer side are calculated by distributing the outer wheel braking force Fout at proportions that are proportional to the maximum values Foutfmax and Foutrmax of braking force as in equation (16) and equation (17) below. Thus, the processing of S90 is completed.

$$Finf=Fin*Finfmax/(Finfmax+Finrmax) \quad (14)$$

$$Finr=Fin*Finrmax/(Finfmax+Finrmax) \quad (15)$$

$$Foutf=Fout*Foutfmax/(Foutfmax+Foutrmax) \quad (16)$$

$$Foutr=Fout*Foutrmax/(Foutfmax+Foutrmax) \quad (17)$$

Referring back to the flowchart of FIG. 11, if the determination at S30 is "NO", that is, if it is determined that the vehicle does not have the spin tendency, the process proceeds to S100. In S100, a reference yaw rate γc is calculated as in equation (18) where Kh is a stability factor, and L is the wheelbase. Furthermore, a target yaw rate γt is calculated as in equation (19) where T is a time constant, and s is a Laplace operator.

$$\gamma c=V*\theta*(1+Kh*V^2)*L \quad (18)$$

$$\gamma t=\gamma c/(1+T*s) \quad (19)$$

Subsequently in S110, it is determined whether a deviation |γt|−|γ| between the absolute value of the target yaw rate γt and the absolute value of the actual yaw rate γ exceeds a reference value γc (positive constant), that is, whether the vehicle is developing a drift-out tendency.

The determination "NO" at S110 means that it has been determined that the vehicle does not have the drift-out tendency and does not have the spin tendency (S30). Therefore, the determination "NO" at S110 means that the vehicle is running stably. Then, the process proceeds to S112, in which the value of an execution flag F indicating whether the behavior control is being executed is set as F=0 to indicate that the behavior control is not being executed. Then, this routine ends.

Conversely, if the determination at S110 is "YES", that is, if it is determined that the vehicle has the drift-out tendency, the process proceeds to S120. In step S120, it is determined whether the lateral acceleration Gy is positive, that is, whether the vehicle is in the left turning state. If the determination at S120 is "YES", the process proceeds to S130, in which the value of a factor K is set to "1". If the determination at S120 is "NO", the process proceeds to S140, in which the value of the factor K is set to "−1".

After S130 or S140, the process proceeds to S150, in which the target yaw moment Mt is set to K*Mtc where Mtc is a constant, and the target longitudinal force Ft is calculated as in equation (20) below.

$$Ft=(|\gamma t|-|\gamma|-\gamma c)*Cd \qquad (20)$$

Subsequently in S160, the friction circle radii Finmax and Foutmax of the inner and outer wheels are calculated as in equations (1) and (2). From the values equal to ⅓ of the friction circle radii, the points P2' to P6' in the map of FIG. 6 are determined. On the basis of the thus-determined map of FIG. 6, the braking forces Fin and Fout of the inner and outer wheels are determined by the above-described technique.

Figure 13:
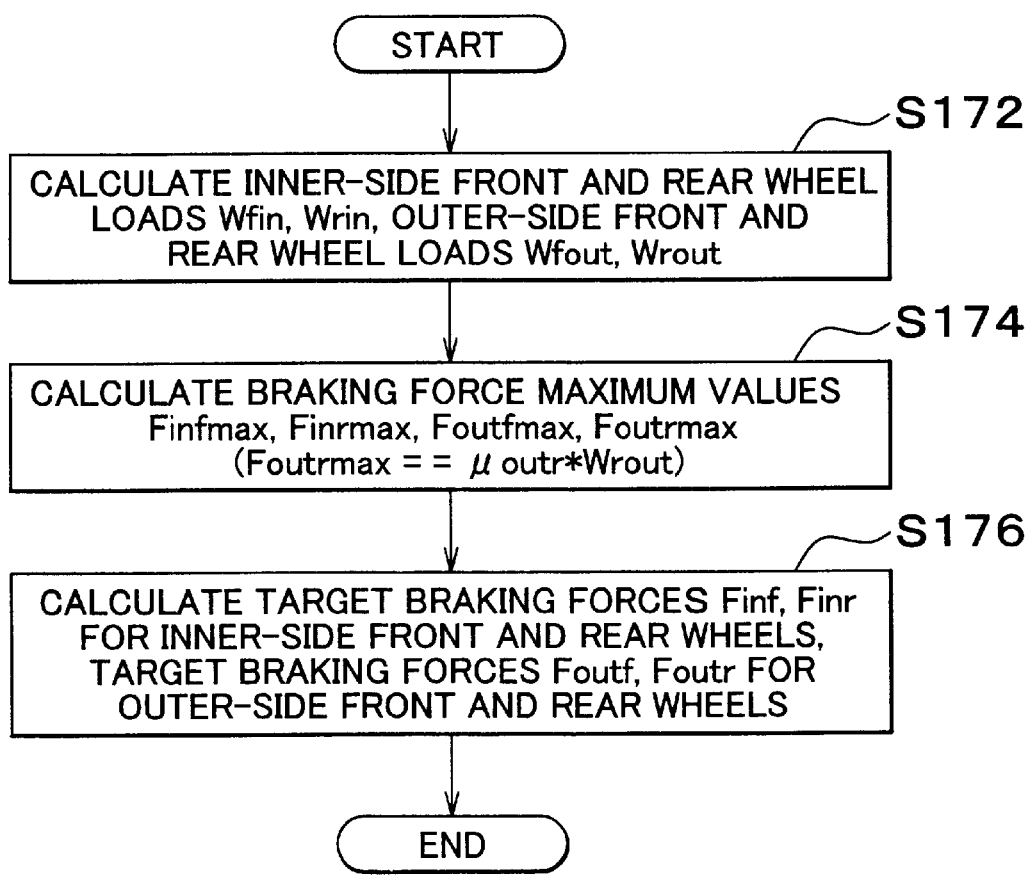
FIG. 13 is a flowchart illustrating a process of distributing braking force between front and rear wheels in S170 of FIG. 11.

Subsequently in S170, the inner wheel braking force Fin and the outer wheel braking force Fout are each distributed between the front and rear wheels in accordance with the flowchart of FIG. 13. Thus, the target braking force for each wheel is calculated. According to the flowchart of FIG. 13, a process substantially the same as that of S92 to S96 in the flowchart of FIG. 12 is executed in S172 to S176. However, in S174, the maximum value Finrmax of the braking force that can be produced on the rear wheel on the turning radius inner side is calculated as in equation (21):

$$Finrmax=\mu inr*Wrin \qquad (21)$$

After that, the process proceeds to S180, in which an engine output suppressing process is executed. Specifically, in this process, the engine output is reduced by automatically narrowing the opening amount of the throttle valve 7 in accordance with quantities of state of the vehicle grasped in S30 or S110. Typically, the degree of opening of the throttle motor is determined in accordance with the amount of depression Accp of the accelerator pedal 30 detected by the accelerator pedal sensor 216. However, during execution of a braking force control for stabilizing the turning behavior of the vehicle through the use of the brake device 10, the throttle motor 8 is driven regardless of the amount of depression Accp of the accelerator pedal 30, so as to operate the throttle valve 7 in the closing direction to a predetermined degree of opening, under a control by the control apparatus 100.

The degree of opening of the throttle valve is predetermined in accordance with various quantities of state of the vehicle, such as the spin tendency, the drift-out tendency, etc., in the form of maps. In S180, the degree of opening of the throttle valve is determined through map search based on the grasped quantity of state of the vehicle. In accordance with the determined degree of opening of the throttle valve, the throttle motor 8 is driven.

Subsequently in S190, the braking force control with respect to each wheel FL, FR, RL, RR is executed. In S190, a target braking pressure for the wheel cylinder 26 of each wheel is calculated based on the target braking force for the wheel calculated in S90 or S170. Furthermore, a duty ratio Dir for each wheel cylinder 26 is calculated as in equation (22):

$$Dir=Kp*(Pi-Pti)+Kd*d(Pi-Pti)dt \qquad (22)$$

where Kp and Kd are gain factors of a proportional term and a differential term in the feedback control of the control pressure, and Pi is the wheel cylinder pressure of each wheel, and Pti is the target wheel cylinder pressure of each wheel.

Then, each wheel cylinder pressure is controlled by executing a process of outputting a control signal corresponding to the duty ratio Dir to a predetermined control valve of the brake actuator 300, so that the braking forces of the wheels FL, FR, RL, RR reach their respective target braking forces.

After this process is executed in S190, the process proceeds to S200, in which the value of the execution flag F is set as F=1 to indicate the vehicle behavior control is being executed. Then, this routine ends.

By performing the above-described control operations, the spin and drift-out tendencies of the vehicle are eliminated. When the spin and drift-out tendencies are eliminated, the determination "NO" is made at S110, and the process proceeds to S112. In S112, the value of the execution flag F is set as F=0, to indicate that the vehicle behavior control has ended.

The vehicle behavior control is thus executed. Description will now be made in conjunction with a case where it is determined in S500 in FIG. 11 that the collision state is being detected, more specifically, a result of detection provided in the collision detecting process illustrated in FIG. 10 indicates that the collision state is being detected (S408).

In this case, after the determination "YES" is made in S500, it is determined in S520 whether the value of the execution flag F is F=1, that is, whether the vehicle behavior control is being executed.

If the determination at S520 is "NO", that is, if the vehicle behavior control is not being executed, this routine immediately ends without setting any control amount. Therefore, the starting of the vehicle behavior control is prohibited while the collision state is being detected.

Conversely, if the determination at S520 is "YES", that is, if the vehicle behavior control is being executed, the process proceeds to S530. In S530, the control state of the braking force control executed in S190 in the previous cycle of the routine is held (maintained). Then, this cycle of the routine ends. If the collision state of the vehicle is still being detected in the subsequent and later cycles of the routine, the control of the behavior control being detected is maintained as described above. Due to this process, the control amount of the vehicle behavior control being executed is maintained at a constant value during the collision state of the vehicle. Therefore, in comparison with a case where the behavior control is immediately ended at the time of a collision, it becomes possible to prevent a great change in the control amount, and therefore prevent an event that the driver is dismayed by a change in the control amount.

If the collision state discontinues, the determination "NO" is made at S500, and the process proceeds to S510, in which it is determined whether there is a failure in any sensor at this moment.

In the sensor failure determining routine illustrated in FIG. 9, an ordinary failure determining process is performed after the vehicle has exited the collision state. Therefore, if all the sensors function normally, the determination "NO" is made at S510, and therefore the ordinary vehicle behavior control starting at S10 can be executed. Due to this process, the state of the vehicle behavior control is held at a fixed state while the collision state of the vehicle is being detected. After the vehicle exits the collision state, a normal vehicle behavior control can be immediately started.

Conversely, if any one of the sensors has a failure when the vehicle has exited the collision state, the determination "NO" is made at S312 in the sensor failure determining routine of FIG. 9. The process then proceeds to S314, in which it is determined that there is a sensor failure.

As a result, in the routine of FIG. 11, the determination "YES" is made at S510, and the process proceeds to S540. In S540, a predetermined process for a sensor failure is executed. For example, if the vehicle behavior control is being executed, the control amount set is gradually decreased. After that, the series of control processes illustrated in FIG. 11 are suspended.

Figure 14:
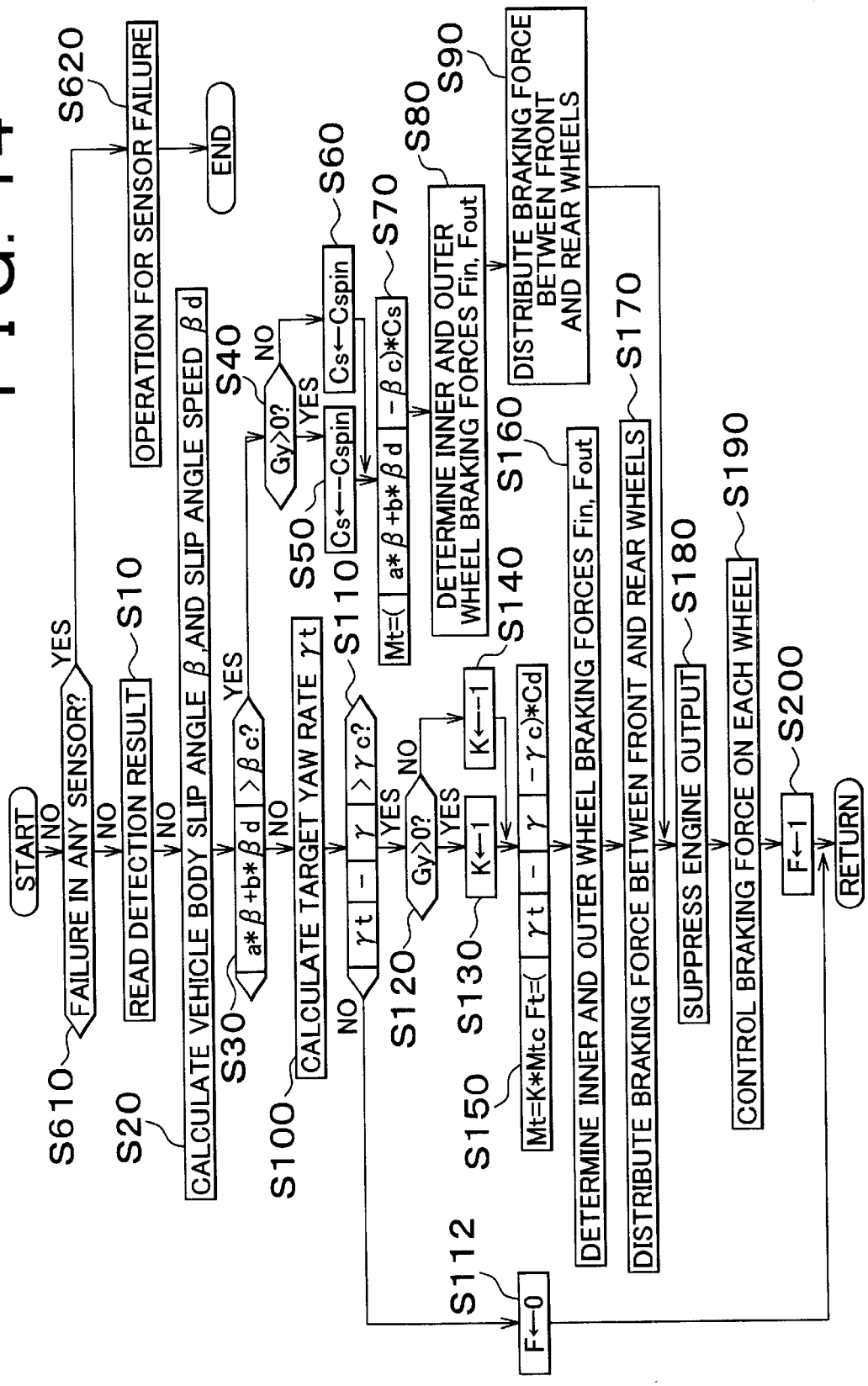
FIG. 14 is a flowchart illustrating a vehicle behavior control process in accordance with a second embodiment of the invention.

A second embodiment of the invention will be described. As a second embodiment of the vehicle behavior control as illustrated in the flowchart of FIG. 11, a routine as illustrated in FIG. 14 may be adopted in which if it is determined in the starting step that a failure has occurred in any one of the sensors ("YES" at S610), a predetermined process for a sensor failure is executed in S620; for example, if the vehicle behavior control is being executed, the control amount set is gradually decreased. In such a case, a sensor failure determining routine may be performed as illustrated in FIG. 15.

Figure 15:
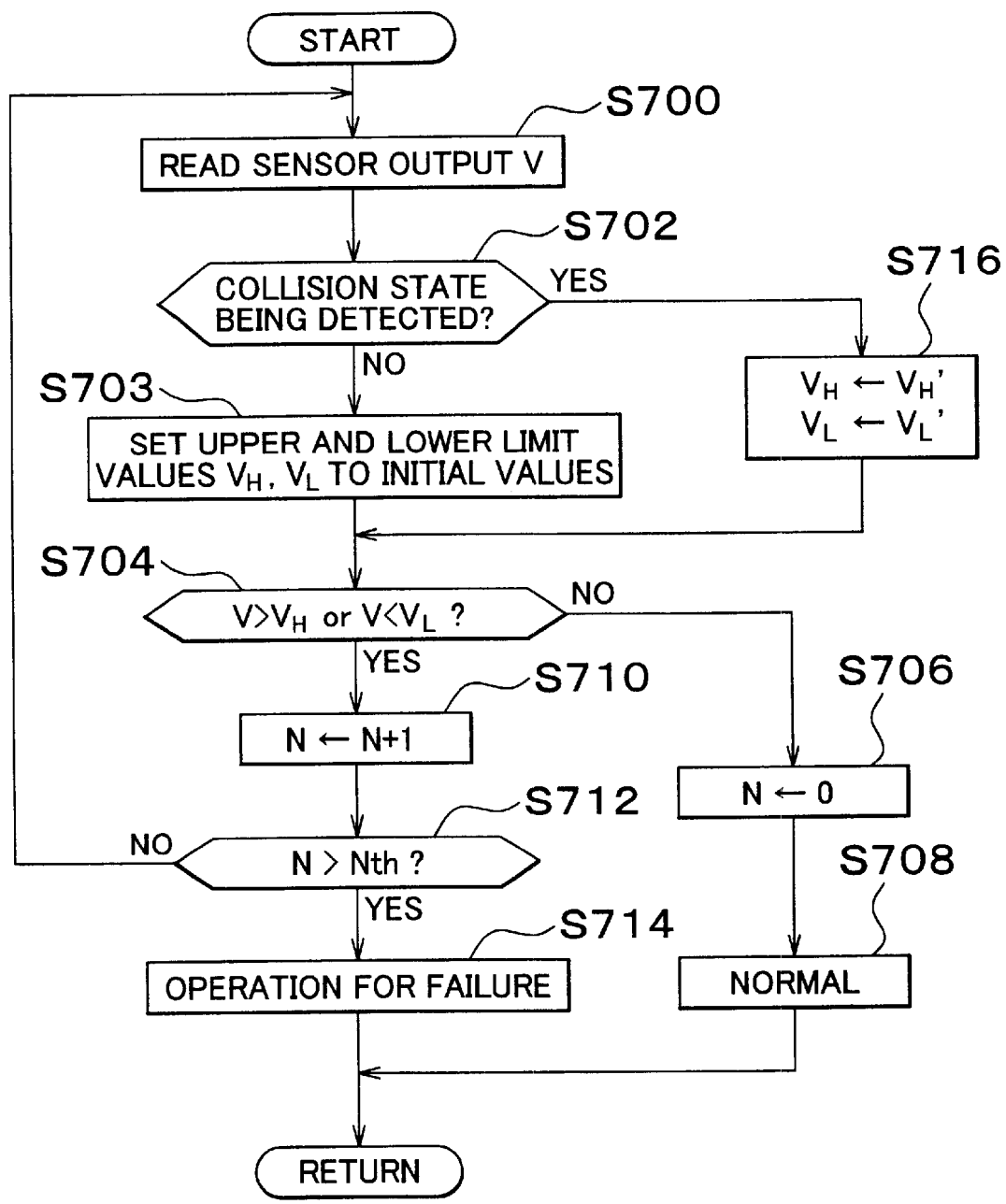
FIG. 15 is a flowchart illustrating a sensor failure determining routine in accordance with the second embodiment of the invention.

In S700 in FIG. 15, a sensor output V, that is, a result of detection by a sensor that is subjected to the failure determining process, is read. Subsequently in S702, it is determined whether the result of determination by the collision determining routine of FIG. 10 is that the collision state is being detected.

If the determination at S702 is "NO", the process proceeds to S703, in which the upper limit value $V_H$ and the lower limit value $V_L$ for evaluating the magnitude of the sensor output V are set to predetermined initial values. Subsequently in S704, it is determined whether the value of the sensor output V is greater than the predetermined upper limit value $V_H$, or is less than the predetermined lower limit value $V_L$. The upper and lower limit values $V_H$, $V_L$ are prescribed based on an output level that could not be continually produced during a normal run of the vehicle (that is, that would not occur in the vehicle during a normal run of the vehicle).

If the determination in S704 is "NO", that is, if the sensor output V is within the range of $V_H \geq V \geq V_L$, it is determined that the sensor has no failure. In this case, the process proceeds to S706, in which the count value N of a counter is reset as N =0. Subsequently in S708, it is determined that the sensor is "normal" as a result of the failure determining routine of the present cycle.

Conversely, if the determination in S704 is "YES", that is, if the value of the sensor output V is greater than the predetermined upper limit value $V_H$, or is less than the predetermined lower limit value $V_L$, the process proceeds to S710, in which the count value N of the counter is incremented. That is, the count value N of the counter is changed to a new count value N by adding "1" to the current count value N.

Subsequently in S712, it is determined whether the count value N incremented in S710 is greater than a predetermined threshold value Nth. If the determination at S712 is "NO", the process goes back to S700. After the above-described process is repeated, it may be determined in S712 that the count value N has become greater than the threshold value Nth ("YES" at S712). This means that a situation in which the magnitude of the sensor output V exceeds the upper or lower limit value $V_H$, $V_L$ has continued for a time prescribed by the threshold value Nth for the count value N.

In this case, the process proceeds to S714, in which a predetermined operation for a sensor failure is performed. For example, a flag indicating occurrence of the sensor failure to other control routines is set, or an indicator lamp indicating occurrence of the sensor failure is turned on.

If the result of determination by the collision determining routine of FIG. 10 is that the collision state is being detected, the determination "YES" is made at S702, and the process proceeds to S716. In S716, the upper limit value $V_H$ for evaluating the vehicle speed V is changed to a value $V_H'$ that is greater than the upper limit value $V_H$, and the lower limit value $V_L$ is changed to a value $V_L'$ that is less than the lower limit value $V_L$.

Thus, while the collision state is being detected, the upper and lower limit values $V_H$, $V_L$ for evaluating the vehicle speed V are changed as described above. Therefore, the fashion of determination in S704 is changed in such a direction as to make the affirmative determination less likely, that is, make it less likely to determine that the sensor has a failure. Thus, even if an excessively great detection result is temporarily output from a sensor due to the effect of an impact caused by a collision or the like, the failure determining process can be changed in such a direction as to make it less likely to immediately determine that the sensor has a failure.

If the determination process of FIG. 10 determines that the vehicle is in the non-collision state, the determination "NO" is made at S702 in FIG. 15, and the process proceeds to S703. In S703, the upper limit value $V_H$ and the lower limit value $V_L$ are set to their respective initial values. Therefore, the usual sensor failure determining process is started again.

In another embodiment, the threshold value Nth for the counter used in S310 in the sensor failure determining routine of FIG. 9 may be changed to a greater value if the collision state is detected. Changing the threshold value to a greater value also changes the failure determining process in such a direction as to make it less likely to determine that the sensor has a failure.

Although in the foregoing embodiments, the vehicle behavior control process is exemplified as a control process to which the sensor failure determining process as exemplified in FIG. 9 or 15, the sensor failure determining process is also applicable to various other control processes of performing a control after a collision, for example, an ABS (antilock brake system) control, a rear wheel steering control of steering the rear wheels in such a direction as to promote the yaw motion at the time of a collision, a suspension control of controlling the suspension so as to curb the roll angle at the time of a collision, etc.

Furthermore, in the foregoing embodiments, the sensor failure determining process is prohibited or the sensor failure determining process is changed while the collision state is being detected. However, such operations are not limited to the case where the collision state is being detected. For example, the prohibition of the sensor failure determining process or the changing of the failure determining process or the like may be performed for a prescribed length of time following a time point at which the collision state is detected.

The control apparatus 100 of the illustrated embodiment is implemented as one or more programmed general purpose computers. It will be appreciated by those skilled in the art that the control apparatus can be implemented using a single special purpose integrated circuit (e.g., ASIC) having a main or central processor section for overall, system-level control, and separate sections dedicated to performing various different specific computations, functions and other processes under control of the central processor section. The control apparatus can be a plurality of separate dedicated or programmable integrated or other electronic circuits or devices (e.g., hardwired electronic or logic circuits such as discrete element circuits, or programmable logic devices such as PLDs, PLAs, PALs or the like). The control apparatus can be implemented using a suitably programmed general purpose computer, e.g., a microprocessor, microcontroller or other processor device (CPU or MPU), either alone or in conjunction with one or more peripheral (e.g., integrated circuit) data and signal processing devices. In general, any device or assembly of devices on which a finite state machine capable of implementing the procedures described herein can be used as the control apparatus. A distributed processing architecture can be for maximum data/signal processing capability and speed.

While the invention has been described with reference to preferred embodiments thereof, it is to be understood that the invention is not limited to the preferred modifications and equivalent arrangements. In addition, while the various elements of the preferred embodiments are shown in various combinations and configurations, which are exemplary, other combinations and configurations, including more, less or only a single element, are also within the spirit and scope of the invention.

What is claimed is:

1. A vehicle control apparatus for controlling a running state of a vehicle, comprising:
    at least one detector that detects the running state of the vehicle; and
    a controller that:
        receives a result of detection by the detector and controls a predetermined vehicle-installed apparatus;
        determines whether the detector has failed;
        restricts a control process by which the controller controls the running state of the vehicle if it is determined that the detector has failed;
        detects a collision state of the vehicle; and
        if the collision state of the vehicle is detected, changes a determining process of determining whether the detector has failed so as to restrict a determination that the detector has failed, for a predetermined time following detection of the collision state.

2. A vehicle control apparatus according to claim 1, wherein the controller controls a braking force applied to each wheel so as to stabilize a vehicle behavior of the vehicle.

3. A vehicle control apparatus according to claim 1, wherein if the collision state of the vehicle is detected, the controller changes the determining process of determining whether the detector has failed so as to determine that the detector is normal, for the predetermined time following the detection of the collision state.

4. A vehicle control apparatus according to claim 1, wherein:
    the controller determines whether the detector has failed based on whether an output of the detector exceeds a predetermined value, and
    if the collision state of the vehicle is detected, the controller changes the predetermined value in such a direction as to restrict the determination that the detector has failed, for the predetermined time following the detection of the collision state.

5. A vehicle control apparatus according to claim 1, wherein:
    the controller determines whether the detector has failed based on whether an output of the detector exceeds a predetermined value for a predetermined time, and
    if the collision state of the vehicle is detected, the controller increases the predetermined time for a predetermined time following the detection of the collision state.

6. A vehicle control apparatus for controlling a running state of a vehicle, comprising:
    at least one detector that detects the running state of the vehicle; and
    a controller that:
        receives a result of detection by the detector and controls a predetermined vehicle-installed apparatus;
        determines whether the detector has failed;
        restricts a control process by which the controller controls the running state of the vehicle if it is determined that the detector has failed;
        detects a collision state of the vehicle; and
        if the collision state of the vehicle is detected, prohibits the restricting operation of control process by the controller for a predetermined time following detection of the collision state.

7. A vehicle control apparatus according to claim 6, wherein the controller controls a braking force applied to each wheel so as to stabilize a vehicle behavior of the vehicle.

8. A vehicle control apparatus for controlling a running state of a vehicle, comprising:
    at least one detector that detects the running state of the vehicle; and
    a controller that:
        receives a result of detection by the detector and controls a predetermined vehicle-installed apparatus;
        determines whether the detector has failed;
        restricts a control process by which the controller controls the running state of the vehicle if it is determined that the detector has failed;
        detects a collision state of the vehicle; and
        if the collision state of the vehicle is detected during a control of the vehicle running state by the controller, prohibits the restricting of the control process and restrains a change in a control state under the control process for a predetermined time following detection of the collision state, and, after an elapse of the predetermined time, cancels prohibition of the control process and restarts the control process by the controller.

9. A vehicle control apparatus according to claim 8, wherein the controller controls a braking force applied to each wheel so as to stabilize a vehicle behavior of the vehicle.

10. A vehicle control apparatus according to claim 8, wherein if the collision state of the vehicle is detected during the control of the vehicle running state by the controller, the control state by the controller is maintained for the predetermined time following the detection of the collision state.

11. A control method for a vehicle having at least one detector that detects a running state of the vehicle, and a controller that receives a result of detection by the detector and controls a predetermined vehicle-installed apparatus, the method comprising:
    determining whether the detector has failed;
    restricting a control process by which the controller controls the vehicle running state if it is determined that the detector has failed;

detecting a collision state of the vehicle; and restricting the determination that the detector has failed, for a predetermined time following detection of the collision state of the vehicle, if the collision state is detected.

12. A vehicle control method according to claim 11, wherein the controller controls a braking force applied to each wheel so as to stabilize a vehicle behavior of the vehicle.

13. A vehicle control method according to claim 11, wherein if the collision state of the vehicle is detected, it is determined that the detector is normal, for the predetermined time following the detection of the collision state.

14. A vehicle control method according to claim 11, wherein:

it is determined whether the detector has failed based on whether an output of the detector exceeds a predetermined value, and if the collision state of the vehicle is detected, the predetermined value is changed in such a direction as to restrict the determination that the detector has failed, for the predetermined time following the detection of the collision state.

15. A vehicle control method according to claim 11, wherein:

it is determined whether the detector has failed based on whether an output of the detector exceeds a predetermined value for a predetermined time, and if the collision state of the vehicle is detected, the predetermined time is increased for a predetermined time following the detection of the collision state.

16. A control method for a vehicle having at least one detector that detects a running state of the vehicle, and a controller that receives a result of detection by the detector and controls a predetermined vehicle-installed apparatus, the method comprising:

determining whether the detector has failed;

restricting a control process by which the controller controls the vehicle running state if it is determined that the detector has failed;

detecting a collision state of the vehicle; and prohibiting the restricting of the control process, for a predetermined time following detection of the collision state of the vehicle if the collision state is detected.

17. A vehicle control method according to claim 16, wherein the controller controls a braking force applied to each wheel so as to stabilize a vehicle behavior of the vehicle.

18. A control method for a vehicle having at least one detector that detects a running state of the vehicle, and a controller that receives a result of detection by the detector and controls a predetermined vehicle-installed apparatus, the method comprising:

determining whether the detector has failed;

restricting a control process by which the controller controls the vehicle running state if it is determined that the detector has failed;

detecting a collision state of the vehicle; and prohibiting the restricting of the control process and restraining a change in a control state under the control process by the controller for a predetermined time following detection of the collision state if the collision state is detected during performance of the control process by the controller, and canceling prohibition of the restricting of the control process and restarting the control process by the controller after the predetermined time elapses.

19. A vehicle control method according to claim 18, wherein the controller controls a braking force applied to each wheel so as to stabilize a vehicle behavior of the vehicle.

20. A vehicle control method according to claim 18, wherein if the collision state of the vehicle is detected during performance of the control process by the controller, the control state by the control means is maintained for the predetermined time following the detection of the collision state.

* * * * *